United States Patent

Keefer

(10) Patent No.: US 6,514,318 B2
(45) Date of Patent: Feb. 4, 2003

(54) MULTISTAGE SYSTEM FOR SEPARATING GAS BY ADSORPTION

(75) Inventor: Bowie G. Keefer, Vancouver (CA)

(73) Assignee: QuestAir Technologies Inc., Burnaby (CA)

(*) Notice: Subject to any disclaimer, the term of this patent is extended or adjusted under 35 U.S.C. 154(b) by 0 days.

(21) Appl. No.: 09/998,443

(22) Filed: Dec. 3, 2001

(65) Prior Publication Data

US 2002/0035924 A1 Mar. 28, 2002

Related U.S. Application Data

(63) Continuation of application No. PCT/CA00/00696, filed on Jun. 12, 2000.

(30) Foreign Application Priority Data

Jun. 10, 1999 (CA) .............................................. 2274390

(51) Int. Cl.[7] .......................................... B01D 53/047
(52) U.S. Cl. ............................. 95/96; 95/102; 95/106; 96/127; 96/132
(58) Field of Search ............................... 95/96, 97, 98, 95/99, 102, 106, 113, 117; 96/125, 126, 127, 131, 132, 133

(56) References Cited

U.S. PATENT DOCUMENTS

| 2,799,362 | A | * | 7/1957 | Miller .......................... 95/113 |
| 4,249,915 | A | * | 2/1981 | Sircar et al. |
| 4,452,612 | A | | 6/1984 | Mattia |
| 4,612,022 | A | * | 9/1986 | Berry ........................... 95/113 |
| 4,790,858 | A | * | 12/1988 | Sircar |
| 4,813,980 | A | * | 3/1989 | Sircar |
| 5,234,472 | A | * | 8/1993 | Krishnamurthy et al. ....... 95/98 |
| 5,447,558 | A | * | 9/1995 | Acharya ........................ 95/104 |
| 5,914,455 | A | * | 6/1999 | Jain et al. .......................... 95/96 |
| 6,051,050 | A | * | 4/2000 | Keefer et al. .................. 95/101 |
| 6,063,161 | A | * | 5/2000 | Keefer et al. .................. 95/100 |

FOREIGN PATENT DOCUMENTS

| EP | 0 311 932 | 4/1989 |
| EP | 0 612 554 A1 | 8/1994 |
| EP | 0 681 860 A2 | 11/1995 |
| WO | WO 99/01202 | 6/1998 |
| WO | WO 99/28013 | 12/1998 |

* cited by examiner

Primary Examiner—David A. Simmons
Assistant Examiner—Frank M. Lawrence
(74) Attorney, Agent, or Firm—Arne I. Fors; Gowling Lafleur Henderson LLP.

(57) ABSTRACT

A pressure swing adsorption system for separating components of a gas mixture includes a first adsorbent module, and a second a adsorbent module coupled to the a first adsorbent module. The first adsorbent module includes a first gas inlet for receiving the gas mixture, at least one bed of first adsorbent material in communication with the first gas inlet for adsorbing a gas mixture component from the gas mixture, and a first gas outlet in communication with the first adsorbent beds for receiving a first product gas therefrom. The second adsorbent module includes a second gas inlet coupled to the first gas outlet for receiving the first product gas, at least one second bed of adsorbent material in communication with the second gas inlet for adsorbing a first product gas component from the first product gas, and a second gas outlet in communication with the second adsorbent beds for receiving a second product gas therefrom. The first product gas substantially excludes the adsorbed gas mixture component, and the second product gas substantially excludes the adsorbed first product gas component. Also, the adsorbent modules are configured for transferring the first product gas between the adsorbent modules over a plurality of discrete pressure levels to maintain substantial uniformity of gas flow therebetween.

22 Claims, 15 Drawing Sheets

MULTISTAGE SYSTEM FOR SEPARATING GAS BY ADSORPTION

This application is a continuation of PCT/CA00/00696, filed Jun. 12, 2000.

FIELD OF THE INVENTION

The present invention relates to a method and apparatus for separating gas fractions from a gas mixture having multiple gas fractions. In particular, the present invention relates to a multistage gas separation system having uniform gas flow between each stage.

BACKGROUND OF THE INVENTION

Pressure swing adsorption (PSA) and vacuum pressure swing adsorption (vacuum-PSA) separate gas fractions from a gas mixture by coordinating pressure cycling and flow reversals over an adsorbent bed which preferentially adsorbs a more readily adsorbed component relative to a less readily adsorbed component of the mixture. The total pressure of the gas mixture in the adsorbent bed is elevated while the gas mixture is flowing through the adsorbent bed from a first end to a second end thereof, and is reduced while the gas mixture is flowing through the adsorbent from the second end back to the first end. As the PSA cycle is repeated, the less readily adsorbed component is concentrated adjacent the second end of the adsorbent bed, while the more readily adsorbed component is concentrated adjacent the first end of the adsorbent bed. As a result, a "light" product (a gas fraction depleted in the more readily adsorbed component and enriched in the less readily adsorbed component) is delivered from the second end of the bed, and a "heavy" product (a gas fraction enriched in the more strongly adsorbed component) is exhausted from the first end of the bed.

The conventional system for implementing pressure swing adsorption uses two or more stationary adsorbent beds in parallel, with directional valving at each end of each adsorbent bed to connect the beds in alternating sequence to pressure sources and sinks. However, this system is often difficult and expensive to implement due to the complexity of the valving required. Further, it is difficult to obtain a process result (e.g. yield, purity) which is not compromised by the limitations imposed by presently-available adsorbent materials. Furthermore, the conventional PSA system makes inefficient use of applied energy, because feed gas pressurization is provided by a compressor whose delivery pressure is the highest pressure of the cycle. Consequently, energy expended in compressing the feed gas used for pressurization is then dissipated in throttling over valves over the instantaneous pressure difference between the adsorber and the high pressure supply.

Numerous attempts have been made at overcoming the deficiencies associated with the conventional PSA system. For example, Siggelin (U.S. Pat. No. 3,176,446), Mattia (U.S. Pat. No. 4,452,612), Davidson and Lywood (U.S. Pat. No. 4,758,253), Boudet et al (U.S. Pat. No. 5,133,784) and Petit et al (U.S. Pat. No. 5,441,559) disclose PSA devices using rotary distributor valves whose rotors are fitted with multiple angularly separated adsorbent beds. Ports communicating with the rotor-mounted adsorbent beds sweep past fixed ports for feed admission, product delivery and pressure equalization. However, these prior art rotary devices are impracticable for large PSA units, owing to the weight of the rotating assembly. Furthermore, since the valve faces are remote from the ends of the adsorbent beds, these rotary distributor valves have poor flow distribution, particularly at high cycle frequencies. Also, the gas separation yields and purities are limited by the constraints of the adsorbent material used.

Hay (U.S. Pat. No. 5,246,676) and Engler (U.S. Pat. No. 5,393,326) provide examples of vacuum pressure swing adsorption systems which reduce throttling losses in an attempt to improve the efficiency of the gas separation process system. The systems taught by Hay and Engler use a plurality of vacuum pumps to pump down the pressure of each adsorbent bed sequentially in turn, with the pumps operating at successively lower pressures, so that each vacuum pump reduces the pressure in each bed a predetermined amount. However, with these systems, the vacuum pumps are subjected to large pressure variations, thereby reducing the efficiency of the gas separation process.

Accordingly, there remains a need for a PSA system which is suitable for high volume and high frequency production, which reduces the energy losses associated with the prior art devices, and can be more readily configured to obtain the desired process results.

SUMMARY OF THE INVENTION

According to the invention, there is provided a gas separation system and method which addresses deficiencies of the prior art.

The gas separation system, according to the present invention, includes a first adsorbent module, and a second adsorbent module coupled to the first adsorbent module. The first adsorbent module includes a first gas inlet for receiving a gas mixture, at least one bed of first adsorbent material in communication with the first gas inlet for adsorbing a gas mixture component from the gas mixture, and a first gas outlet in communication with the first adsorbent beds for receiving a first product gas therefrom. The second adsorbent module includes a second gas inlet coupled to the first gas outlet for receiving the first product gas, at least one second bed of adsorbent material in communication with the second gas inlet for adsorbing a first product gas component from the first product gas, and a second gas outlet in communication with the second adsorbent beds for receiving a second product gas therefrom. The first product gas substantially excludes the adsorbed gas mixture component, and the second product gas substantially excludes the adsorbed first product gas component. Also, the adsorbent modules are configured for transferring the first product gas between the adsorbent modules over a plurality of discrete pressure levels to maintain substantial uniformity of gas flow therebetween.

The gas separation method, according to the present invention, includes the steps of (1) providing a first adsorbent module including at least one bed of a first adsorbent material; (2) providing a second adsorbent module in communication with the first adsorbent module, the second adsorbent module including at least one bed of a second adsorbent material; (3) adsorbing a gas mixture component from the gas mixture with the first adsorbent material; (4) transferring a first product gas from between the first adsorbent module and the second adsorbent module with substantially uniform gas flow, the first product gas substantially excluding the adsorbed gas mixture component; (5) adsorbing a first product gas component from the first product gas with the second adsorbent material, and (6) extracting a second product gas from the second adsorbent module, the second product gas substantially excluding the adsorbed first product gas component.

In accordance with a preferred embodiment of the present invention, each adsorbent module comprises a rotary pressure swing adsorbent module. Each rotary pressure swing adsorbent module includes a stator and a rotor. The stator includes a first stator valve surface, a second stator valve surface, a plurality of first function compartments opening into the first stator valve surface, and a plurality of second function compartments opening into the second stator valve surface. The rotor is rotatably coupled to the stator and includes a first rotor valve surface in communication with the first stator valve surface, a second rotor valve surface in communication with the second stator valve surface.

A plurality of flow paths having adsorbent material therein are disposed in the rotors. Each of the flow paths includes a pair of opposite flow path ends. A plurality of apertures are provided in the rotor valve surfaces in communication with the flow path ends and the function compartments for cyclically exposing the flow paths to a plurality of discrete pressure levels to maintain uniformity of gas flow through the function compartments. In this manner, product gas is transferred between the adsorbent modules at the plurality of discrete pressure levels with substantially uniform gas flow, thereby reducing energy losses. Further, the first rotor can be operated at a different speed than the second rotor, and the first and second adsorbent material can be selected independently of each other so as to obtain the desired process results more readily.

BRIEF DESCRIPTION OF THE DRAWINGS

The preferred embodiments of the present invention will now be described, by way of example only, with reference to the drawings in which.

DETAILED DESCRIPTION OF THE PREFERRED EMBODIMENTS

FIGS. 1, 2, 3 and 4

Figure 1:
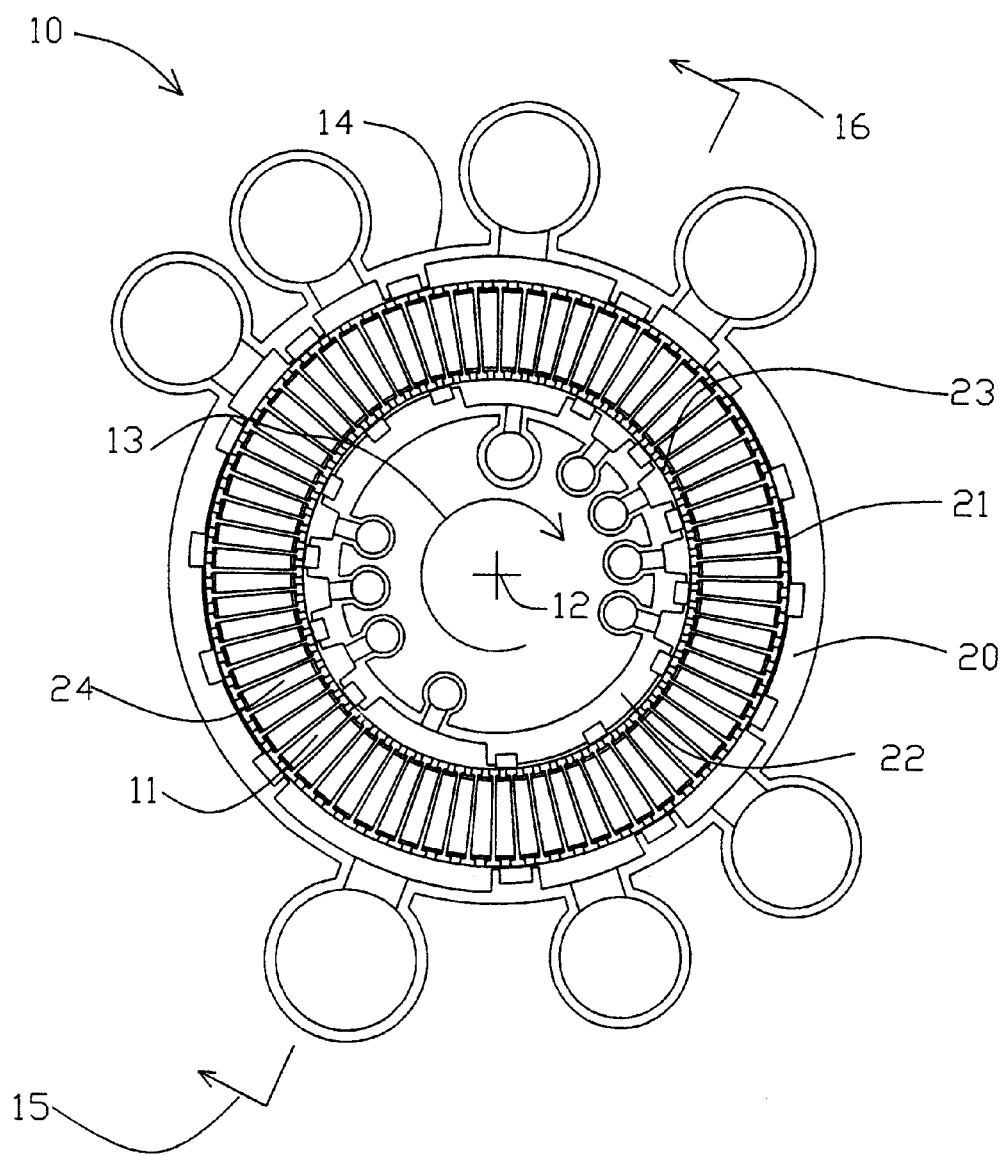
FIG. 1 is a sectional view of a rotary PSA module according to the present invention, showing the stator, the rotor and the adsorber situated in the rotor.

A rotary adsorbent module 10 according to the present invention is shown in FIGS. 1, 2, 3, 4 and 5. The module includes a rotor 11 revolving about axis 12 in the direction shown by arrow 13 within stator 14. In general, the apparatus of the invention may be configured for flow through the adsorber elements in the radial, axial or oblique conical directions relative to the rotor axis. However, for operation at high cycle frequency, radial flow has the advantage that the centripetal acceleration will lie parallel to the flow path for most favorable stabilization of buoyancy-driven free convection, as well as centrifugal clamping of granular adsorbent with uniform flow distribution.

Figure 2:
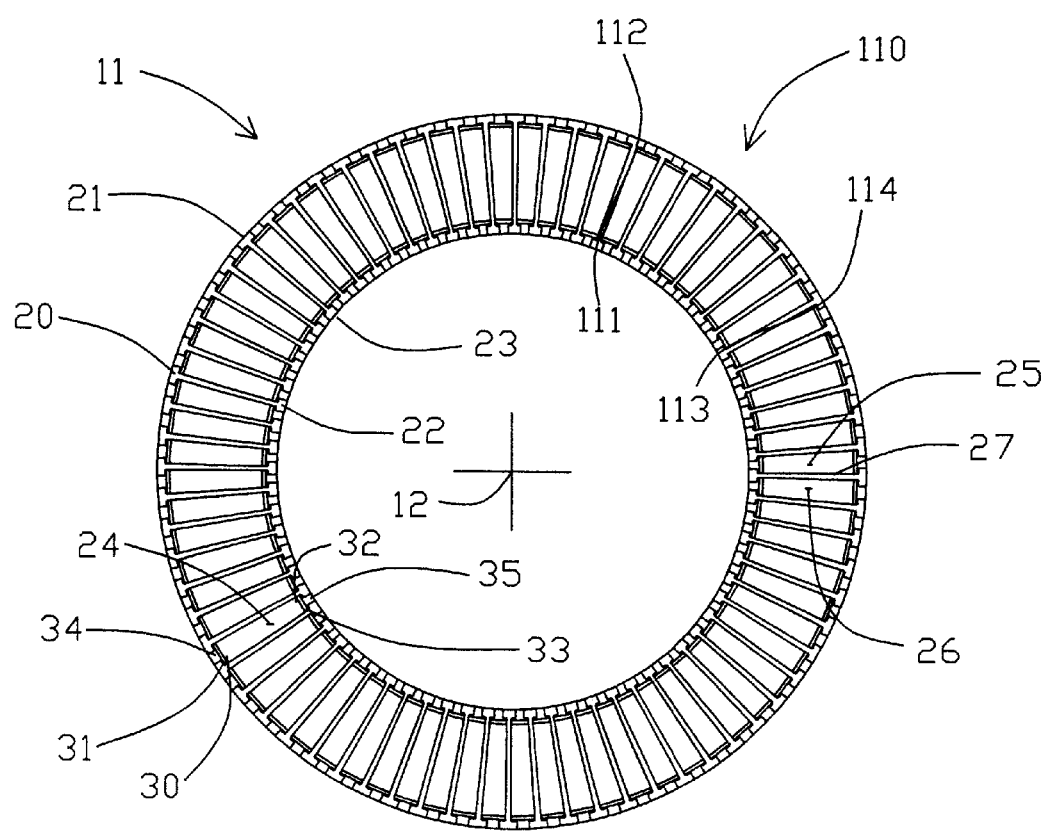
FIG. 2 is a sectional view of the module of FIG. 1, with the stator deleted for clarity.

As shown in FIG. 2, for an example of radial flow, the rotor 11 is of annular section, having concentrically to axis 12 an outer cylindrical wall 20 whose external surface is first valve surface 21, and an inner cylindrical wall 22 whose internal surface is second valve surface 23. The rotor has (in the plane of the section defined by arrows 15 and 16 in FIG. 4) a total of "N" radial flow adsorber elements 24. An adjacent pair of adsorber elements 25 and 26 are separated by partition 27 which is structurally and sealingly joined to outer wall 20 and inner wall 22. Adjacent adsorber elements 25 and 26 are angularly spaced relative to axis 12 by an angle of [360°/N].

Adsorber element 24 has a first end 30 defined by support screen 31 and a second end 32 defined by support screen 33. The adsorber may be provided as granular adsorbent, whose packing voidage defines a flow path contacting the adsorbent between the first and second ends of the adsorber.

First aperture or orifice 34 provides flow communication from first valve surface 21 through wall 20 to the first end 30 of adsorber 24. Second aperture or orifice 35 provides flow communication from second valve surface 23 through wall 22 to the second end 31 of adsorber 24. Support screens 31 and 33 respectively provide flow distribution 32 between first aperture 34 and first end 30, and between second aperture 35 and second end 32, of adsorber element 24.

Support screen 31 also supports the centrifugal force loading of the adsorbent.

Figure 3:
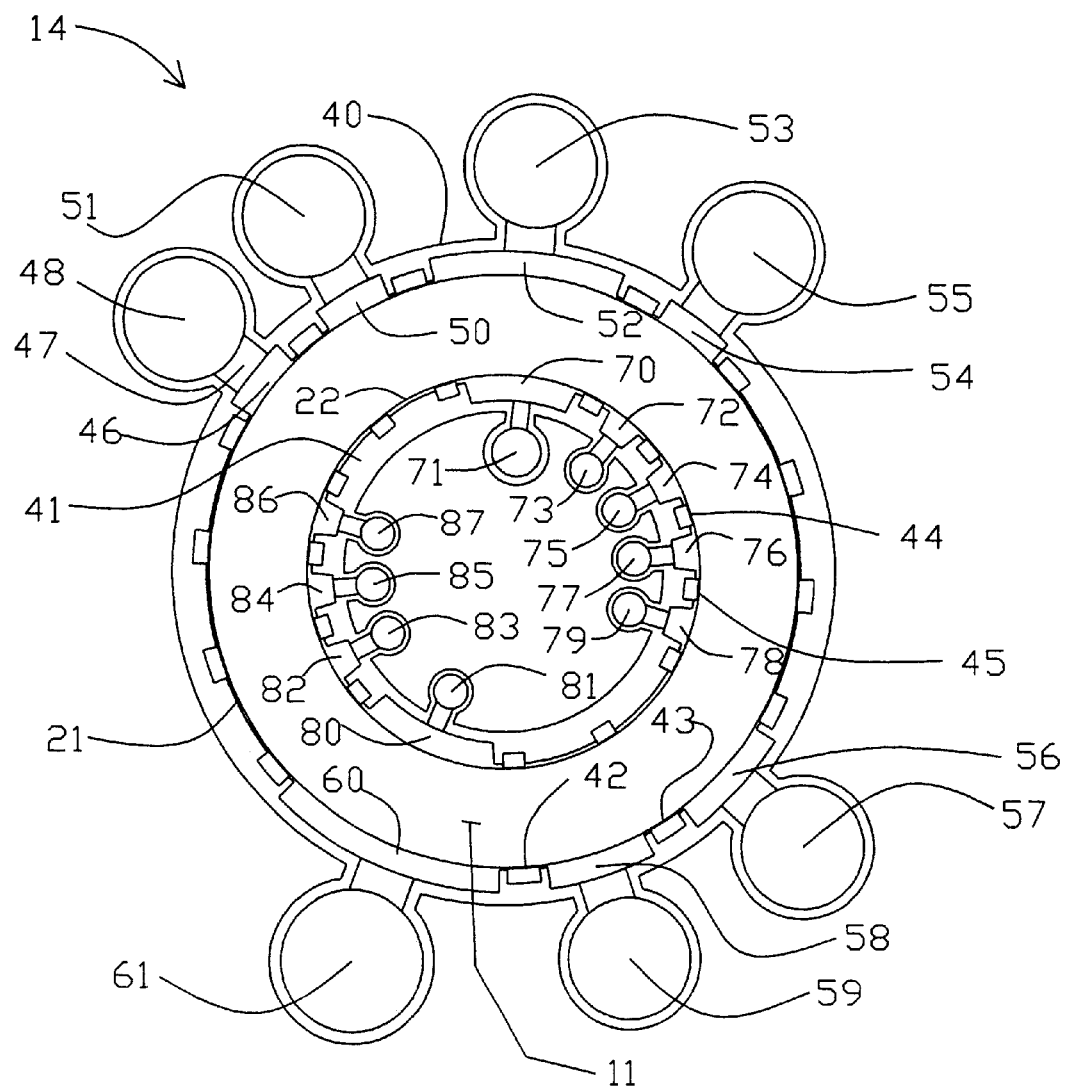
FIG. 3 is a sectional view of the stator shown in FIG. 1, with the adsorbers deleted for clarity.

As shown in FIG. 3, stator 14 is a pressure housing including an outer cylindrical shell or first valve stator 40 outside the annular rotor 11, and an inner cylindrical shell or second valve stator 41 inside the annular rotor 11. Outer shell 40 carries axially extending strip seals (e.g. 42 and 43) sealingly engaged with first valve surface 21, while inner shell 41 carries axially extending strip seals (e.g. 44 and 45) sealingly engaged with second valve surface 23. The azimuthal sealing width of the strip seals is greater than the diameters or azimuthal widths of the first and second apertures 34 and 35 opening through the first and second valve surfaces.

A set of first function compartments in the outer shell each open in an angular sector to the first valve surface 21, and each provide fluid communication between its angular sector of the first valve surface 21 and a manifold external to the module. The first function compartments include first feed pressurization compartment 46, second feed pressurization compartment 50, first feed compartment 52, second feed compartment 54, first countercurrent blowdown compartment 56, second countercurrent blowdown compartment 58, and a heavy product compartment 60. The angular sectors of the compartments are much wider than the angular separation of the adsorber elements. The first function compartments are separated on the first sealing surface by the strip seals (eg. 42).

Proceeding clockwise in FIG. 3, in the direction of rotor rotation, a first feed pressurization compartment 46 communicates by conduit 47 to first feed pressurization manifold 48, which is maintained at a first intermediate feed pressure. Similarly, a second feed pressurization compartment 50 communicates to second feed pressurization manifold 51, which is maintained at a second intermediate feed pressure higher than the first intermediate feed pressure.

For greater generality, module 10 is shown with provision for sequential admission of two feed mixtures, the first feed gas having a lower concentration of the more readily adsorbed component relative to the second feed gas. First feed compartment 52 communicates to first feed manifold 53, which is maintained at a first feed pressure higher working pressure than that of the second intermediate feed pressure. Likewise, second feed compartment 54 communicates to second feed manifold 55, which is maintained at a second feed pressure higher than that of the first feed pressure.

A first countercurrent blowdown compartment 56 communicates to first countercurrent blowdown manifold 57, which is maintained at a first countercurrent blowdown intermediate pressure. A second countercurrent blowdown compartment 58 communicates to second countercurrent blowdown manifold 59, which is maintained at a second countercurrent blowdown intermediate pressure above the lower working pressure. A heavy product compartment 60 communicates to heavy product exhaust manifold 61 which is maintained at substantially the lower working pressure. It will be noted that compartment 58 is bounded by strip seals 42 and 43, and similarly all the compartments are bounded and mutually isolated by strip seals.

A set of second function compartments in the inner shell each open in an angular sector to the second valve surface 23, and each provide fluid communication between its angular sector of the second valve surface 23 and a manifold external to the module. The second function compartments are separated on the second sealing surface by the strip seals (e.g. 44). The second function compartments include light product compartment 70, first light reflux exit compartment 72, first cocurrent blowdown compartment (or third light reflux exit compartment) 76, third cocurrent blowdown compartment (or fourth light reflux exit compartment) 78, purge compartment 80, first light reflux pressurization compartment 82, second light reflux pressurization compartment 84, and a third light reflux pressurization compartment 86.

Proceeding clockwise in FIG. 3, again in the direction of rotor rotation, light product compartment 70 communicates to light product manifold 71, and receives light product gas at substantially the higher working pressure, less frictional pressure drops through the adsorbers and the first and second orifices. According to the angular extension of compartment 70 relative to compartments 52 and 54, the light product may be obtained only from adsorbers simultaneously receiving the first feed gas from compartment 52, or from adsorbers receiving both the first and second feed gases.

A first light reflux exit compartment 72 communicates to first light reflux exit manifold 73, which is maintained at a first light reflux exit pressure, here substantially the higher working pressure less frictional pressure drops. A first cocurrent blowdown compartment 74 (which is actually the second light reflux exit compartment), communicates to second light reflux exit manifold 75, which is maintained at a first cocurrent blowdown pressure less than the higher working pressure. A second cocurrent blowdown compartment or third light reflux exit compartment 76 communicates to third light reflux exit manifold 77, which is maintained at a second cocurrent blowdown pressure less than the first cocurrent blowdown pressure. A third cocurrent blowdown compartment or fourth light reflux exit compartment 78 communicates to fourth light reflux exit manifold 79, which is maintained at a third cocurrent blowdown pressure less than the second cocurrent blowdown pressure.

A purge compartment 80 communicates to a fourth light reflux return manifold 81, which supplies the fourth light reflux gas which has been expanded from the third cocurrent blowdown pressure to substantially the lower working pressure with an allowance for frictional pressure drops.

The ordering of light reflux pressurization steps is inverted from the ordering or light reflux exit or cocurrent blowdown steps, so as to maintain a desirable "last out-first in" stratification of light reflux gas packets. Hence a first light reflux pressurization compartment 82 communicates to a third light reflux return manifold 83, which supplies the third light reflux gas which has been expanded from the second cocurrent blowdown pressure to a first light reflux pressurization pressure greater than the lower working pressure. A second light reflux pressurization compartment 84 communicates to a second light reflux return manifold 85, which supplies the second light reflux gas which has been expanded from the first cocurrent blowdown pressure to a second light reflux pressurization pressure greater than the first light reflux pressurization pressure. Finally, a third light reflux pressurization compartment 86 communicates to a first light reflux return manifold 87, which supplies the first light reflux gas which has been expanded from approximately the higher pressure to a third light reflux pressurization pressure greater than the second light reflux pressurization pressure, and in this example less than the first feed pressurization pressure.

Each of the first and second function compartments are sequentially exposed to each of the "N" adsorbers 24 as rotor 11 revolves about axis 12. As a result, substantially uniform gas flow is realized within the first and second function compartments, thereby facilitating use of rotary module 10 in a steady state environment.

Figure 4:
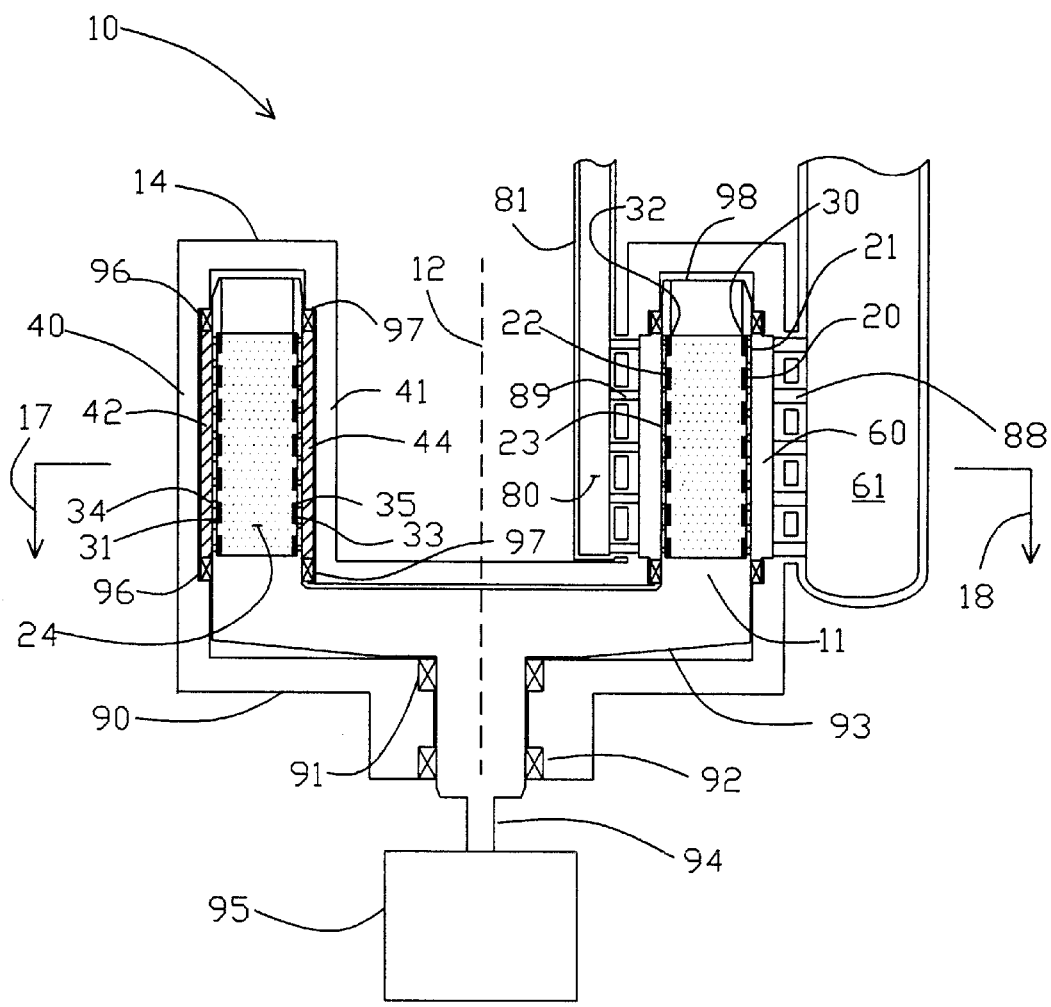
FIG. 4 is an axial section of the module of FIG. 1.

Additional structural details concerning rotary module 10 are shown in FIG. 4. Conduits 88 connect first compartment 60 to manifold 61, with multiple conduits providing for good axial flow distribution in compartment 60. Similarly, conduits 89 connect second compartment 80 to manifold 81. Stator 14 has base 90 with bearings 91 and 92. The annular rotor 11 is supported on end disc 93, whose shaft 94 is supported by bearings 91 and 92. Motor 95 is coupled to shaft 94 to drive rotor 11. The rotor could alternatively rotate as an annular drum, supported by rollers at several angular positions about its rim and also driven at its rim so that no shaft would be required. A rim drive could be provided by a ring gear attached to the rotor, or by a linear electromagnetic motor whose stator would engage an arc of the rim. Outer circumferential seals 96 seal the ends of outer strip seals 42 and the edges of first valve surface 21, while inner circumferential seals 97 seal the ends of inner strip seals 44 and the edges of second valve surface 23. Rotor 11 has access plug 98 between outer wall 20 and inner wall 22, which provides access for installation and removal of the adsorbent in adsorbers 24.

It is also possible within the invention to have an integral multiple of "M" groups of "N" adsorbers 24 in a single rotor 11, so that the angular extent for edge 11a to edge 11b is 360°. This has the disadvantage of greater complexity of fluid connections to the first and second valve means, but the advantages of slower rotational speed (by a factor of "M" for the same PSA cycle frequency) and a symmetric pressure and stress distribution. With "M"=2, FIG. 5 represents each 360° side of rotor 11.

Figure 5:
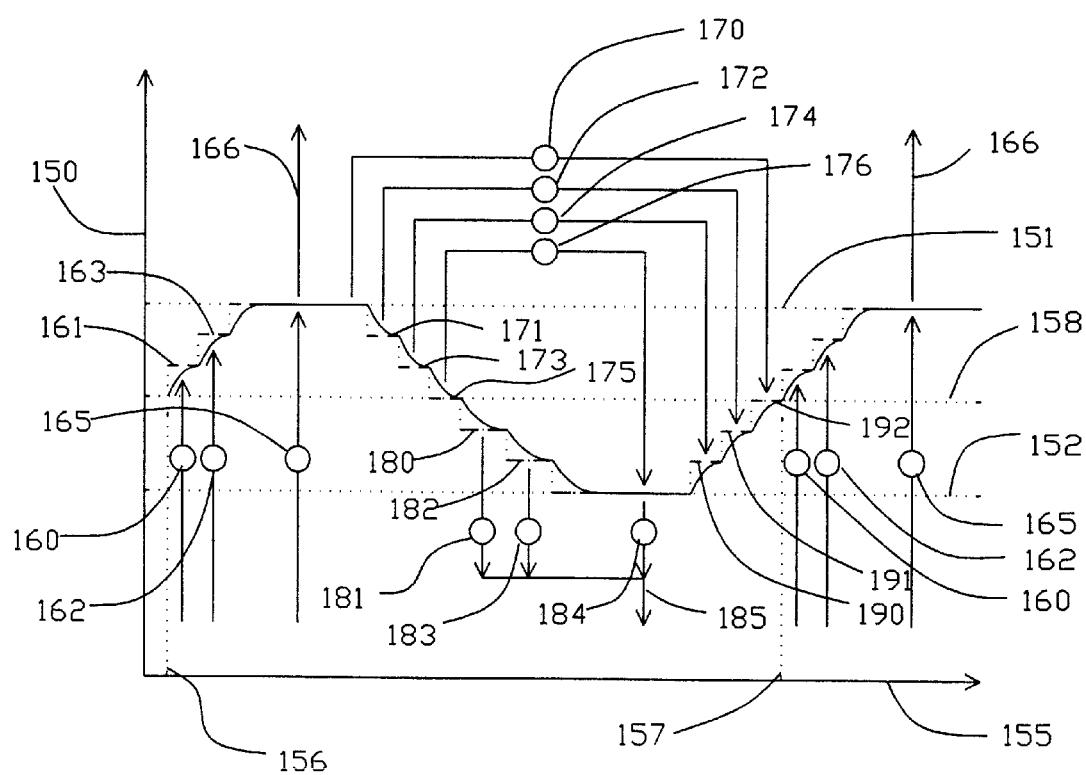
FIG. 5 shows a typical PSA cycle attainable with the present invention.
Figure 6:
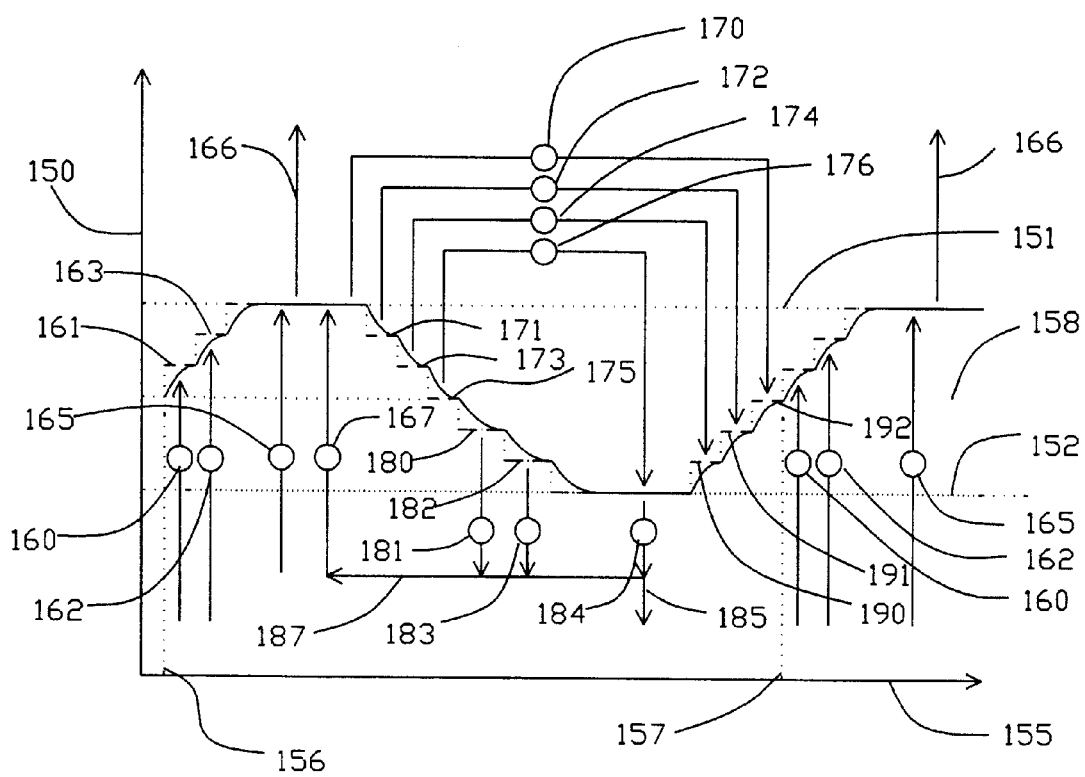
FIG. 6 shows one variation of the PSA cycle with heavy reflux, attainable with the present invention.

FIGS. 5 and 6

FIG. 5 shows a typical PSA cycle which would be obtained using the gas separation system according to the invention. In particular, it shows a PSA cycle undergone sequentially by each of "N" adsorbers 24 over a cycle period "T". The cycle in consecutive adsorbers is displaced in phase by a time interval of T/N.

In FIGS. 5 and 6, the vertical axis 150 indicates the working pressure in any one of the adsorbers 24 (and the pressure in the first and second function compartments with which the one adsorber 24 is communicating with) at any particular time over the cycle period "T". Pressure drops due to flow within the adsorber elements are neglected. The higher and lower working pressures are respectively indicated by dotted lines 151 and 152.

The horizontal axis 155 of FIGS. 5 and 6 indicates time, with the PSA cycle period defined by the time interval between points 156 and 157. At times 156 and 157, the working pressure in a particular adsorber is pressure 158. Starting from time 156, the cycle for a particular adsorber 24 begins as the first aperture 34 of that adsorber is opened to the first feed pressurization compartment 46, which is fed by first feed supply means 160 at the first intermediate feed pressure 161. The pressure in that adsorber rises from pressure 158 at time 157 to the first intermediate feed pressure 161. Proceeding ahead, first aperture passes over a seal strip, first closing adsorber 24 to compartment 46 and then opening it to second feed pressurization compartment 50 which is fed by second feed supply means 162 at the second intermediate feed pressure 163. The adsorber pressure rises to the second intermediate feed pressure.

First aperture 34 of adsorber 24 is opened next to first feed compartment 52, which is maintained at substantially the higher pressure 151 by a third feed supply means 165. Once the adsorber pressure has risen to substantially the higher working pressure 151, its second aperture 35 (which has been closed to all second compartments since time 156) opens to light product compartment 70 and delivers light product 166 which is typically richer in the less readily adsorbed component than that provided by the supply means 160, 162, 165.

In the cycle of FIG. 6, first aperture 34 of adsorber 24 is opened next to second feed compartment 54, also maintained at substantially the higher pressure 151 by a fourth feed supply means 167. In general, the fourth feed supply means supplies a second feed gas, relatively richer in the more readily adsorbed component than the first feed gas provided by the first, second and third feed supply means. In the specific cycle illustrated in FIG. 6, the fourth feed supply means 167 is a "heavy reflux" compressor, recompressing a portion of the heavy product back into the apparatus. In the cycle illustrated in FIG. 5, there is no fourth feed supply means, and compartment 54 could be eliminated or consolidated with compartment 52 extended over a wider angular arc of the stator.

While feed gas is still being supplied to the first end of adsorber 24 from either compartment 52 or 54, the second end of adsorber 24 is closed to light product compartment 70 and opens to first light reflux exit compartment 72 while delivering "light reflux" gas (enriched in the less readily adsorbed component, similar to second product gas) to first light reflux pressure let-down means (or expander) 170. The first aperture 34 of adsorber 24 is then closed to all first function compartments, while the second aperture 35 is opened successively to (a) second light reflux exit compartment 74, dropping the adsorber pressure to the first cocurrent blowdown pressure 171 while delivering light reflux gas to second light reflux pressure letdown means 172, (b) third light reflux exit compartment 76, dropping the adsorber pressure to the second cocurrent blowdown pressure 173 while delivering light reflux gas to third light reflux pressure letdown means 174, and (c) fourth light reflux exit compartment 78, dropping the adsorber pressure to the third cocurrent blowdown pressure 175 while delivering light reflux gas to fourth light reflux pressure letdown means 176. Second aperture 35 is then closed for an interval, until the light reflux return steps following the countercurrent blowdown steps.

The light reflux pressure let-down means may be mechanical expanders or expansion stages for expansion energy recovery, or may be restrictor orifices or throttle valves for irreversible, pressure let-down.

Either when the second aperture is closed after the final light reflux exit step (as shown in FIGS. 5 and 6), or earlier while light reflux exit steps are still underway, first aperture 34 is opened to first countercurrent blowdown compartment 56, dropping the adsorber pressure to the first countercurrent blowdown intermediate pressure 180 while releasing "heavy" gas (enriched in the more strongly adsorbed component) to first exhaust means 181. Then, first aperture 34 is opened to second countercurrent blowdown compartment 58, dropping the adsorber pressure to the first countercurrent blowdown intermediate pressure 182 while releasing heavy gas to second exhaust means 183. Finally reaching the lower working pressure, first aperture 34 is opened to heavy product compartment 60, dropping the adsorber pressure to the lower pressure 152 while releasing heavy gas to third exhaust means 184. Once the adsorber pressure has substantially reached the lower pressure while first aperture 34 is open to compartment 60, the second aperture 35 opens to purge compartment 80, which receives fourth light reflux gas from fourth light reflux pressure let-down means 176 in order to displace more heavy gas into first product compartment 60.

In FIG. 5, the heavy gas from the first, second and third exhaust means is delivered as the heavy product 185. In FIG. 6, this gas is partly released as the heavy product 185, while the balance is redirected as "heavy reflux" 187 to the heavy reflux compressor as fourth feed supply means 167. Just as light reflux enables an approach to high purity of the less readily adsorbed ("light") component in the light product, heavy reflux enables an approach to high purity of the more readily adsorbed ("heavy") component in the heavy product.

The adsorber is then repressurized by light reflux gas after the -first and second apertures close to compartments 60 and 80. In succession, while the first aperture 34 remains closed at least initially, (a) the second aperture 35 is opened to first light reflux pressurization compartment 82 to raise the adsorber pressure to the first light reflux pressurization pressure 190 while receiving third light reflux gas from the third light reflux pressure letdown means 174, (b) the second aperture 35 is opened to second light reflux pressurization compartment 84 to raise the adsorber pressure to the second light reflux pressurization pressure 191 while receiving second light reflux gas from the second light reflux pressure letdown means 172, and (c) the second aperture 35 is opened to third light reflux pressurization compartment 86 to raise the adsorber pressure to the third light reflux pressurization pressure 192 while receiving first light reflux gas from the first light reflux pressure letdown means 170. Unless feed pressurization has already been started while light reflux return for light reflux pressurization is still underway, the process (as based on FIGS. 5 and 6) begins feed pressurization for the next cycle after time 157 as soon as the third light reflux pressurization step has been concluded.

The pressure variation waveform in each adsorber would be a rectangular staircase if there were no throttling in the first and second valves. In order to provide balanced performance of the adsorbers, preferably all of the apertures are closely identical to each other.

The rate of pressure change in each pressurization or blowdown step will be restricted by throttling in ports (or in clearance of labyrinth sealing gaps) of the first and second valve means, or by throttling in the apertures at first and second ends of the adsorbers, resulting in the typical pressure waveform depicted in FIGS. 5 and 6. Alternatively, the apertures may be opened slowly by the seal strips, to provide flow restriction throttling between the apertures and the seal strips, which may have a serrated edge (e.g. with notches or tapered slits in the edge of the seal strip) so that the apertures are only opened to full flow gradually. Excessively rapid rates of pressure change would subject the adsorber to mechanical stress, while also causing flow transients which would tend to increase axial dispersion of the concentration wavefront in the adsorber. Pulsations of flow and pressure are minimized by having a plurality of adsorbers simultaneously transiting each step of the cycle, and by providing enough volume in the function compartments and associated manifolds so that they act effectively as surge absorbers between the compression machinery and the first and second valve means.

It will be evident that the cycle could be generalized by having more or fewer intermediate stages in each major step of feed pressurization, countercurrent blowdown exhaust, or light reflux. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 7

Figure 7:
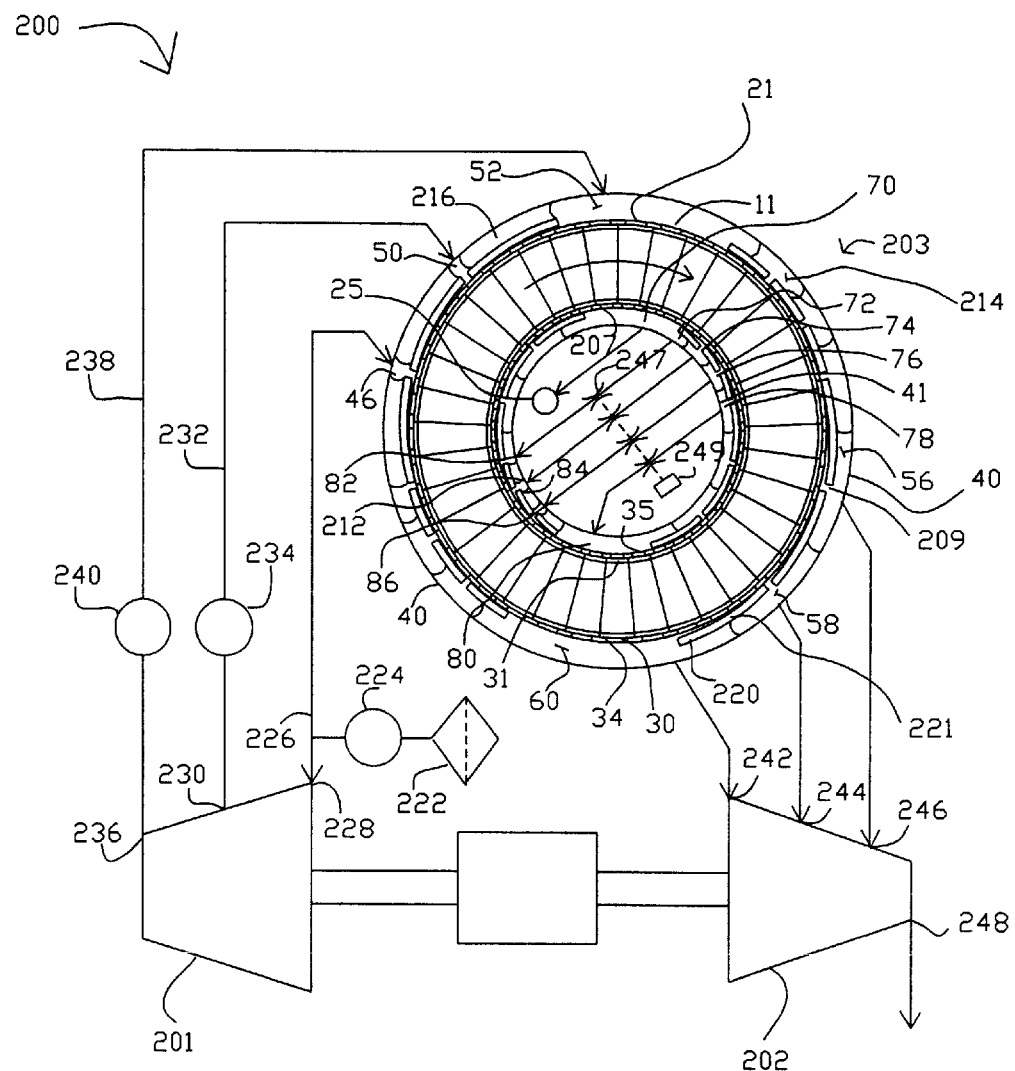
FIG. 7 is a schematic of a vacuum pressure swing adsorption module according to the present invention with a multistage or split stream centrifugal compressor or split stream exhaust

FIG. 7 shows a vacuum pressure swing adsorption (VPSA) air separation system 200, with a multistage or split stream centrifugal compressor 201 and a multistage or split stream exhaust pump 202. The rotary adsorber module 203 includes rotor 11 and a stator assembly comprising a first valve stator 40 and a second valve stator 41. Rotor 11 may be configured for radial flow as suggested in FIG. 7, or for axial flow.

Rotor 11 contains "N" adsorbers 24 with the flow path oriented radially between first end 30 and second end 31 of the adsorbers 24. The adsorber first ends 30 open by apertures 34 to a sealing face 207 with the first valve stator 40. Sealing face 207 has ports 209 to define the first valve means 21. First valve stator 40 has a plurality of functional compartments in fluid communication to sealing face 207 by ports 209, including a first feed pressurization supply compartment 46, a second feed pressurization supply compartment 50, a first countercurrent blowdown exhaust compartment 56, a second countercurrent blowdown exhaust compartment 58, and a purge exhaust compartment 60 at substantially the lower pressure.

The adsorber second ends 31 open by apertures 35 to a sealing face 210 with the second valve stator 41. Sealing race 210 has ports 212 to define the second valve means 23. Second valve stator 41 includes, with each compartment in fluid communication to sealing face 210 by ports 212, a light product delivery compartment 70 at substantially the higher pressure, a first light reflux exit compartment 72 which is, in the embodiment shown, the downstream end of compartment 70, a second light reflux exit compartment 74, a third light reflux exit compartment 76, a fourth light reflux exit compartment 78, a fourth light reflux return compartment 80 for purge at substantially the lower pressure, a third light reflux return compartment or first light reflux pressurization compartment 86, a second light reflux return compartment or second light reflux pressurization compartment 84, and a first light reflux return compartment or third light reflux pressurization compartment 82. The angular spacing of ports communicating to the compartments in the first and second valve stators 40 and 41 defines the timing of the PSA cycle steps similar to the cycles in FIGS. 5 and 6.

In this example, sealing faces 207 and 210 are respectively-defined by the outer and inner radii of the annular rotor 11. Fluid sealing between the functional compartments and corresponding sealing faces is achieved by clearance seals. The clearance seals are provided by slippers 220 attached to the first and second valve stators by partitions 27. Partitions 27 provide static sealing between adjacent compartments. Slippers 220 engage the sealing faces with narrow fluid sealing clearances, which also provide throttling of gas flows between the adsorbers and functional compartments in each pressure-changing step, so that each adsorber may smoothly equalize in pressure to the pressure of the next functional compartment about to be opened to that adsorber. In addition to the functional compartments, static pressure balancing compartments (e.g. 214 and 216) are provided behind some clearance seal slippers. The static pressure balancing compartments are disposed in angular sectors of the first and second valve stators not used as functional compartments, in order to establish a controlled pressure distribution behind the clearance slippers so as to maintain their positive sealing engagements without excessive contact pressure and consequent friction.

Apparatus 200 has a feed air inlet filter 222, from which feed air is conveyed through optional dehumidifier 224 and conduit 226 to feed compressor inlet 228. In this example, the first intermediate feed pressurization pressure is selected to be substantially atmospheric pressure, so conduit 226 also communicates to first feed pressurization compartment 46. The feed compressor 201 has a first discharge port 230 at the second intermediate feed pressurization pressure communicating by conduit 232 and optional dehumidifier 234 to compartment 50 and a second discharge port 236 at substantially the higher pressure of the cycle pressure communicating by conduit 238 and optional dehumidifier 240 to compartment 52.

Exhaust vacuum pump 202 has a first inlet port 242 at substantially the lower pressure of the cycle in fluid communication with the exhaust compartment 60, a second inlet port 244 at the second countercurrent blowdown pressure in fluid communication with compartment 56, and a third inlet port 248 at the first countercurrent blowdown pressure in fluid communication with compartment 56. Vacuum pump 202 compresses the combined exhaust and countercurrent blowdown gas to form a second product gas enriched in the more readily adsorbed component to substantially atmospheric pressure, and discharges the second product gas from discharge port 248.

In the option of light reflux pressure let-down without energy recovery, throttle valves 247 provide pressure let-down for each of four light reflux stages, respectively between light reflux exit and return compartments 72 and 82, 74 and 84, 76 and 86, and 78 and 80. Actuator means 249 is provided to adjust the orifices of the throttle valves.

FIGS. 8, 9, 10 and 11

Figure 8:
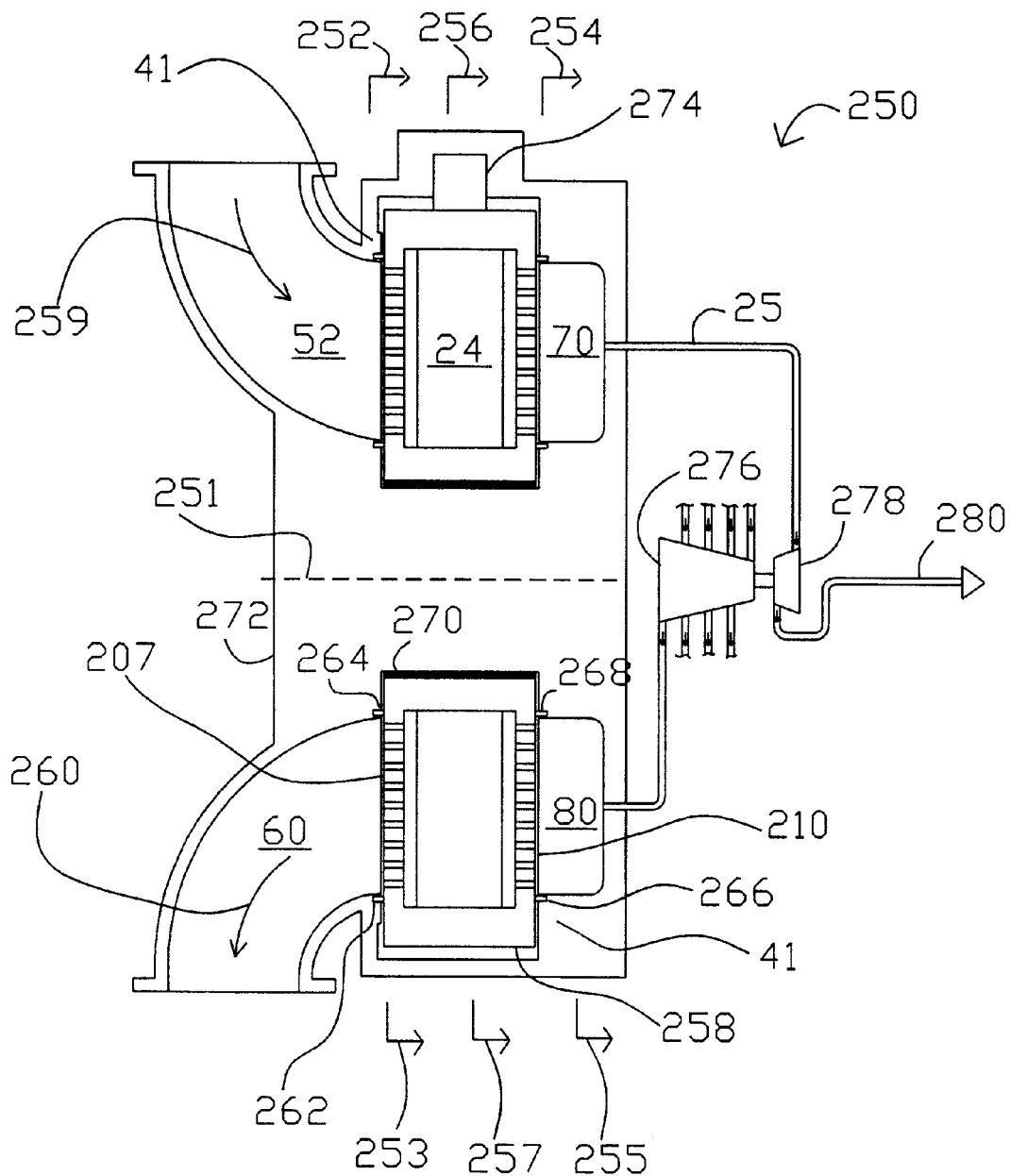
FIG. 8 is a schematic of an axial flow rotary PSA module according to the present invention.
Figure 9:
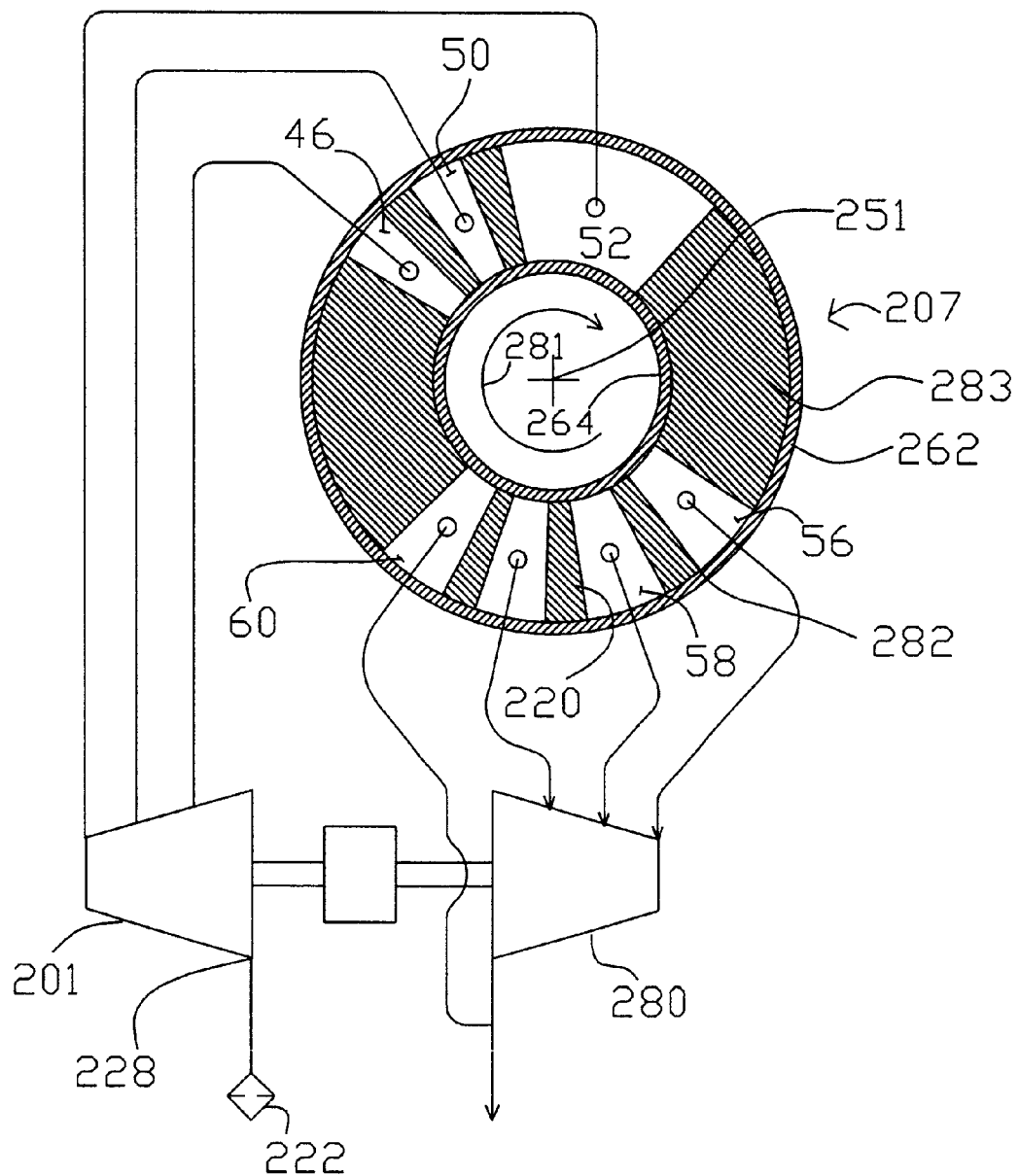
FIG. 9 shows the first valve face of the axial flow module of FIG. 8.
Figure 10:
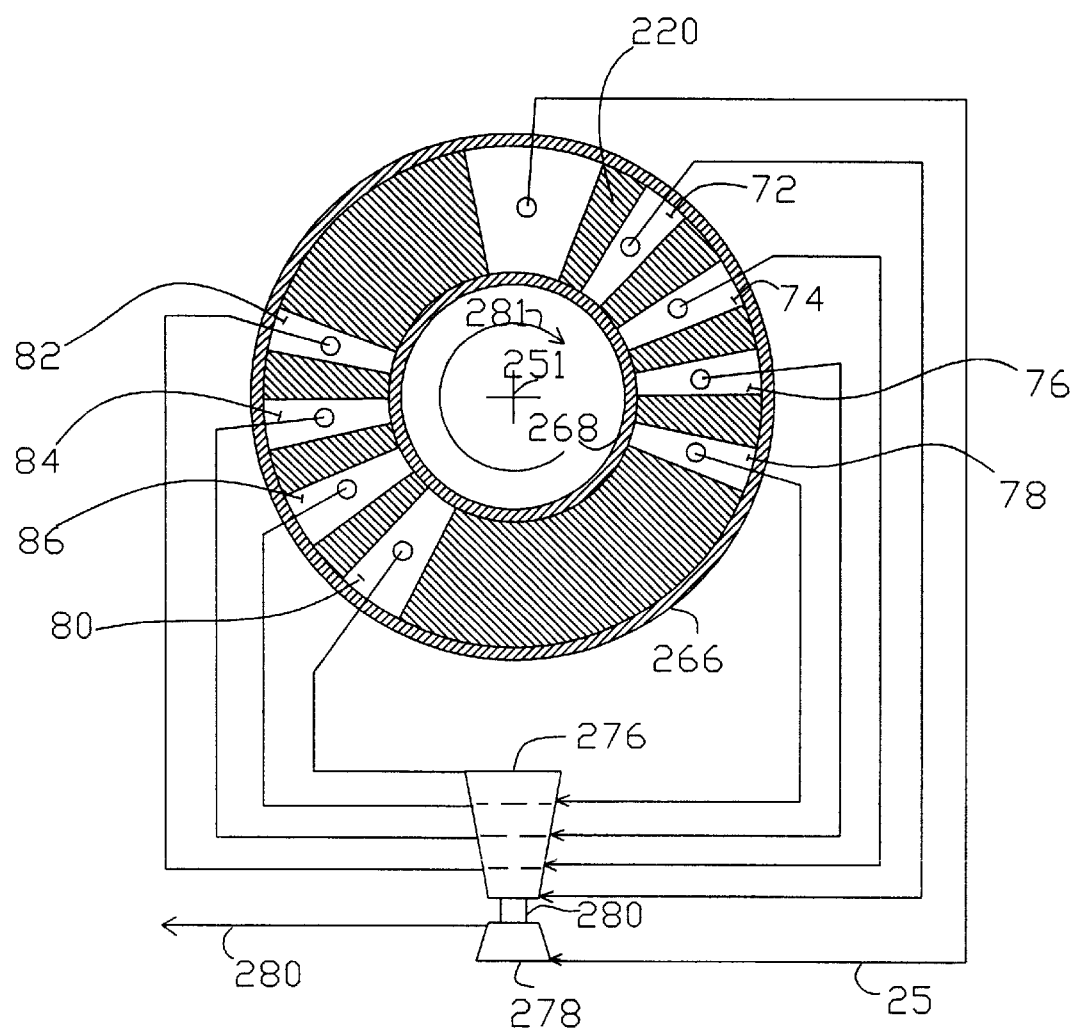
FIG. 10 shows the second valve face of the axial flow module of FIG. 8.
Figure 11:
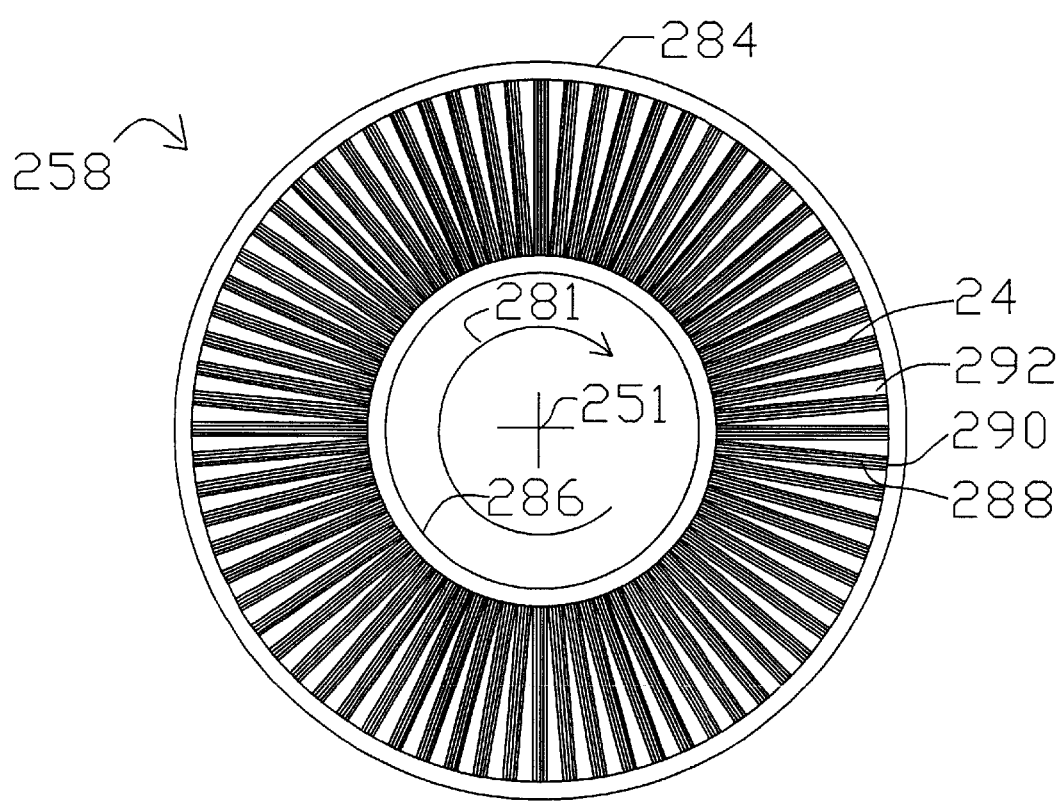
FIG. 11 shows an adsorber wheel configuration based on laminated adsorbent sheet adsorbers for the module of FIG. 8.

Referring to FIG. 8, an axial flow rotary PSA module 250 is shown, particularly suitable for smaller scale oxygen generation. The flow path in adsorbers 24 is parallel to axis 251. The steps of the process and functional compartments are still in the same angular relationship regardless of a radial or axial flow direction in the adsorbers. FIGS. 9, 10, and 11 depict cross sections of module 250 in the planes respectively defined by arrows 252-253, 254 255, and 256-257 in FIG. 8. FIG. 8 is an axial section of module 250 through compartments 52 and 70 at the higher pressure, and compartments 80 and 117 at the lower pressure. The adsorber rotor 11 contains "N" adsorbers 24 in adsorber wheel 258, and revolves between the first valve stator 40 and the second valve stator 41. Compressed feed air is supplied to compartment 52 as indicated by arrow 259, while nitrogen enriched exhaust gas is exhausted from purge exhaust compartment 60 as indicated by arrow 260.

At the ends of rotor 11, circumferential seals 262 and 264 bound sealing face 207, and circumferential seals 266 and 268 bound second sealing face 210. The sealing faces are flat discs. The circumferential seals also define the ends of clearance slippers 220 in the sealing faces between the functional compartments. Rotor 11 is supported by bearing 270 in housing 272, which is integrally assembled with the first and second valve stators. Rotor 11 is driven by rim motor 274, which may have a friction, geared or belt engagement with the outer rim of rotor 11. By installing rim motor 274 within housing 272, the module is totally enclosed so as to preclude leakage, either of hazardous process fluids (in this example, enriched oxygen) to the external environment, or of atmospheric contaminants (e.g. humidity which could deactivate the adsorbent) into the apparatus.

Illustrating the option of light reflux pressure letdown with energy recovery, a split stream light reflux expander 276 is provided to provide pressure let-down of four light reflux stages with energy recovery. The light reflux expander provides pressure let-down for each of four light reflux stages, respectively between light reflux exit and return compartments 72 and 82, 74 and 84, 76 and 86, and 78 and 80.

Light reflux expander 276 is coupled to a light product pressure booster compressor 278 by drive shaft 280. Compressor 278 receives the light product from conduit 25, and delivers light product (compressed to a delivery pressure above the higher pressure of the PSA cycle) to delivery conduit 280. Since the light reflux and light product are both enriched oxygen streams of approximately the same purity, expander 276 and light product compressor 278 may be hermetically enclosed in a single housing. This configuration of "turbocompressor" oxygen booster without a separate drive motor is advantageous, as a useful pressure boost of the product oxygen can be achieved without an external motor and corresponding shaft seals, and can also be very compact when designed to operate at very high shaft speeds.

FIG. 9 shows the first valve face of module 250 of FIG. 8, at section 252-253, with fluid connections to a multistage or split stream feed compressor 201 and to a multistage or split stream countercurrent blowdown expander 280 as in FIG. 8.

Arrow 281 indicates the direction of rotation by adsorber rotor 11. The open area of valve face 207 ported to the feed and exhaust compartments is indicated by clear angular segments 46–116 corresponding to those functional compartments, between circumferential seals 262 and 264. The substantially closed area of valve face 207 between functional compartments is indicated by cross-hatched sectors 282 and 283 which are clearance slippers 220. Typical closed sector 282 provides a transition for an adsorber, between being open to compartment 56 and open to compartment 58. Gradual opening is provided by a tapering clearance channel between the slipper and the sealing face, so as to achieve gentle pressure equalization of an adsorber being opened to a new compartment. Much wider closed sectors, such as sector 283, are provided to substantially close flow to or from one end of the adsorbers when pressurization or blowdown is being performed from the other end.

FIG. 10 shows the second valve face of module 200 of FIG. 8, at section 254-255, with fluid connections to a split stream light reflux expander 276 and light product booster compressor 278 as in FIG. 5. Fluid sealing principles and alternatives are similar to those of FIG. 9. Similar principles and alternatives apply to radial flow and axial flow geometries, respectively sealing on cylindrical or disc faces.

FIG. 11 shows an adsorber wheel configuration for the embodiment of FIG. 8, at section 256-257. The adsorber configuration of FIG. 11 is similar to a radial flow geometry shown in FIGS. 1–4, and is characterized by seventy-two adsorbers 24 (i.e. N=72). The adsorbers 24 are mounted between outer wall 284 and inner wall 286 of adsorber wheel 258. Each adsorber comprises a rectangular flat pack of adsorbent sheets 288, with spacers 290 between the sheets to define flow channels here in the axial direction. Separators 292 are provided between the adsorbers to fill void space and prevent leakage between the adsorbers.

The adsorbent sheets comprise a reinforcement material, in preferred embodiments glass fibre, metal foil or wire mesh, to which the adsorbent material is attached with a suitable binder. For air separation to produce enriched oxygen, typical adsorbents are X, A or chabazite type zeolites, typically exchanged with lithium, calcium strontium and/or other cations, and with optimized silicon/aluminum ratios as well known in the art. The zeolite crystals are bound with silica, clay and other binders, or self-bound, within the adsorbent sheet matrix.

Satisfactory adsorbent sheets have been made by coating a slurry of zeolite crystals with binder constituents onto the reinforcement material, with successful examples including nonwoven fiber glass scrims, woven metal fabrics, and expanded aluminum foils. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven fiber glass scrims, and metal foils with etched flow channels in a photolithographic pattern.

Typical experimental sheet thicknesses have been 150 microns, with spacer heights in the range of 100 to 150 microns, and adsorber flow channel length approximately 20 cm. Using X type zeolites, excellent performance has been achieved in oxygen separation from air at PSA cycle frequencies in the range of 30 to 150 cycles per minute.

FIG. 12

Figure 12:
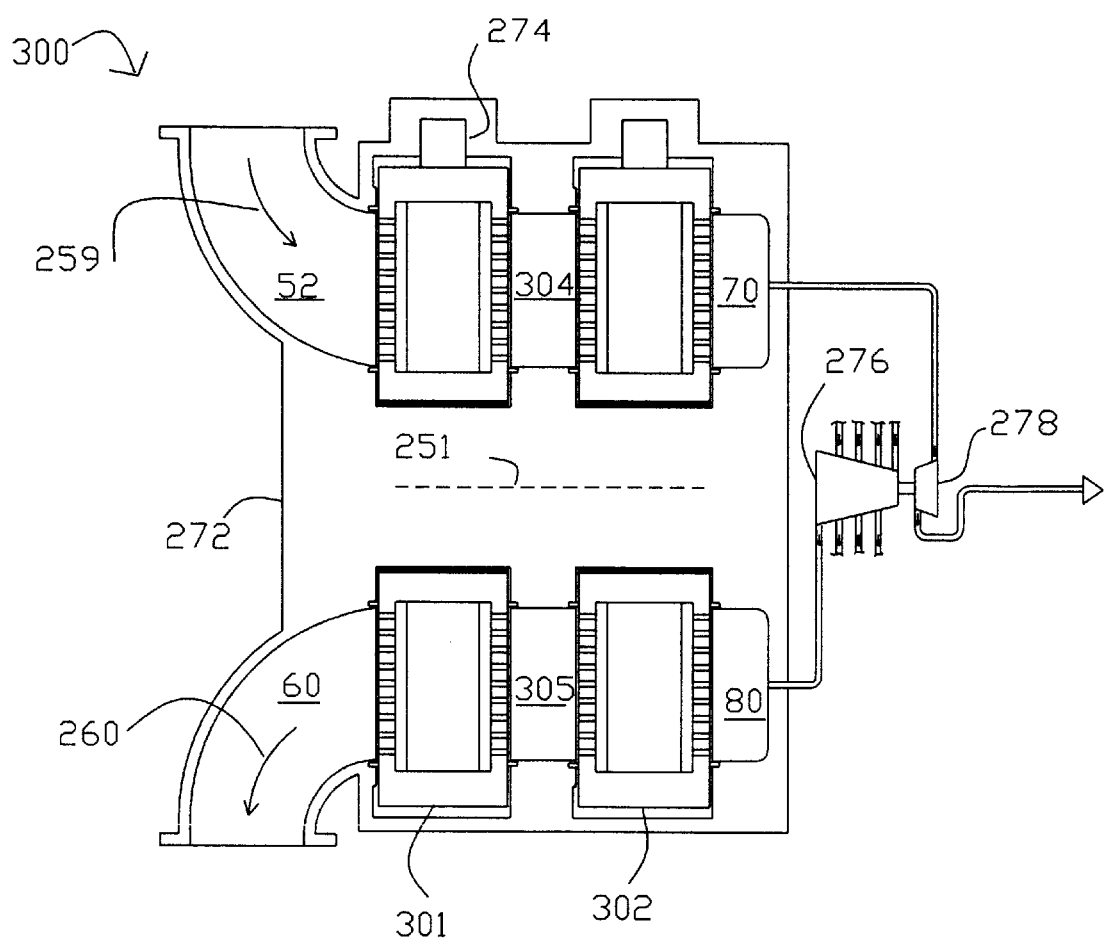
FIG. 12 shows a two stage rotary PSA module according to the present invention having two adsorber wheels in series.

Referring to FIG. 12, a longitudinal cross-sectional view of a two-stage gas separation module 300 is shown having a first stage module 301, and a second stage module 302 both configured for axial gas flow, with the first module having a first adsorber wheel and the second module having a second adsorber wheel, and the two modules being integrated with both wheels in a single housing 272. However, it should be understood that the invention is not limited to axial flow configurations. Accordingly, in one variation (not shown), the modules 301, 302 are configured for radial flow with one of the modules 301, 302 being disposed within the inner radius of the other of the modules 301, 302.

The first stage 301 is a chemical desiccant dryer having alumina gel as an adsorbent material, and includes a plurality of first feed gas function compartments corresponding to pressurization compartments 46, 50, 52 of the rotary module 10, a plurality of first product function compartments corresponding to light reflux exit compartments 72, 74, 76, 78, a plurality of second feed gas function compartments corresponding to light reflux return compartments 80, 82, 84, 86, and a plurality of second product function compartments, which correspond respectively to blowdown compartments 56, 58, 60.

The second stage 302 is an axial flow oxygen-PSA concentrator, similar to the axial flow rotary PSA module 250 shown in FIG. 8, including lithium and/or calcium exchanged low silica faujasite adsorbents. As in FIG. 8, the oxygen-PSA concentrator includes a plurality of first feed gas function compartments, a plurality of light reflux exit function compartments, a light product compartment 70, a plurality of light reflux return function compartments (such as light reflux return compartment 80), and a plurality of countercurrent blowdown compartments. The first product function compartments of the first stage 301 communicate with the first feed gas function compartments of the second stage 302 through respective connecting compartments, such as compartment 304. Similarly, the countercurrent blowdown function compartments of the second stage 302 communicate with the second feed gas function compartments of the first stage 301 through respective connecting compartments, such as compartment 305. In addition, a split stream light reflux expander 276 is provided to provide pressure let-down for the light reflux stages of the second stage module 302 with energy recovery.

In operation, compressed humid air is introduced into the first module 301 in the sector open to compartment 52. A product gas comprising dehydrated compressed air exits module 301 and flows through connecting compartment 304 into the second module 302. Gas entering the second module 302 is further purified to produce a relatively pure oxygen stream flowing out of module 302 and into compartment 70. Simultaneously, the exhaust step at the lower pressure is conducted with purge oxygen entering the second adsorber wheel of module 302 in the sector open to compartment 80, via the light reflux expander 276. Enriched nitrogen is exhausted from the second adsorber wheel to the first adsorber wheel through connecting compartment 305, and humid nitrogen enriched air is exhausted from the first adsorber wheel to compartment 60.

Preferably, the rotational frequencies, angular interval for each step, and other characteristics of each module 301, 302 are tailored to suit the contemplated gaseous separation. Accordingly, for effective removal of water from the feed air received by the first module 301, and for effective separation of oxygen gas from the dry air received by the second module 301 from the first module 301, preferably the rotor in the first module 301 is rotated at a speed of approximately 10 to 20 RPM, and the rotor in the second module 302 is rotated at a speed of approximately 50 to 100 RPM.

It will be appreciated that by operating the first module 301 and the second module 302 with different rotational frequency and angular intervals, both of the modules 301, 302 will be exposed to pressure variations which can stress the associated compression machinery and reduce the overall efficiency of the chemical separation occurring in each module 301, 302. Accordingly, preferably the first module 301 and the second module 302 each comprises a rotary module 10 so that the first product function compartments and the second feed gas function compartments are maintained at substantially constant pressure levels and, therefore, the rate of gas flow between the first stage module 301 and the second stage module 302 is substantially constant. However, other gas separation modules, besides the rotary module 10, may be used for maintaining constant pressure levels across the connecting compartments 304, 305.

It will also be appreciated that by employing different adsorbers in the first and second module 301, 302, the apparatus 300 can be configured to obtain results previously not possible with only a single adsorbent. For instance, nitrogen selective lithium zeolites are a preferred adsorbent for separating oxygen gas from air. However, it is known that such adsorbent material are prone to deactivation when exposed to humid air. Accordingly, by employing a chemical desiccant dryer as the first stage 301, the apparatus 300 is able to achieve favorable separation without deactivation of the expensive lithium zeolites.

However, it should be understood that the invention is not limited to a first stage comprising a desiccant dryer. Rather, other adsorbent materials maybe used in the first stage 301 without departing from the scope of the invention. Further, the first stage 301, and the second stage 302 may employ similar adsorbent materials for improved concentration of product gases. In addition, the invention may employ more than two stages, with each stage delivering a different product gas or with each stage delivering the same product gas but with different levels of purity. Alternately, any of the stages may deliver a product gas to another stage for further processing.

FIG. a 13

Figure 13:
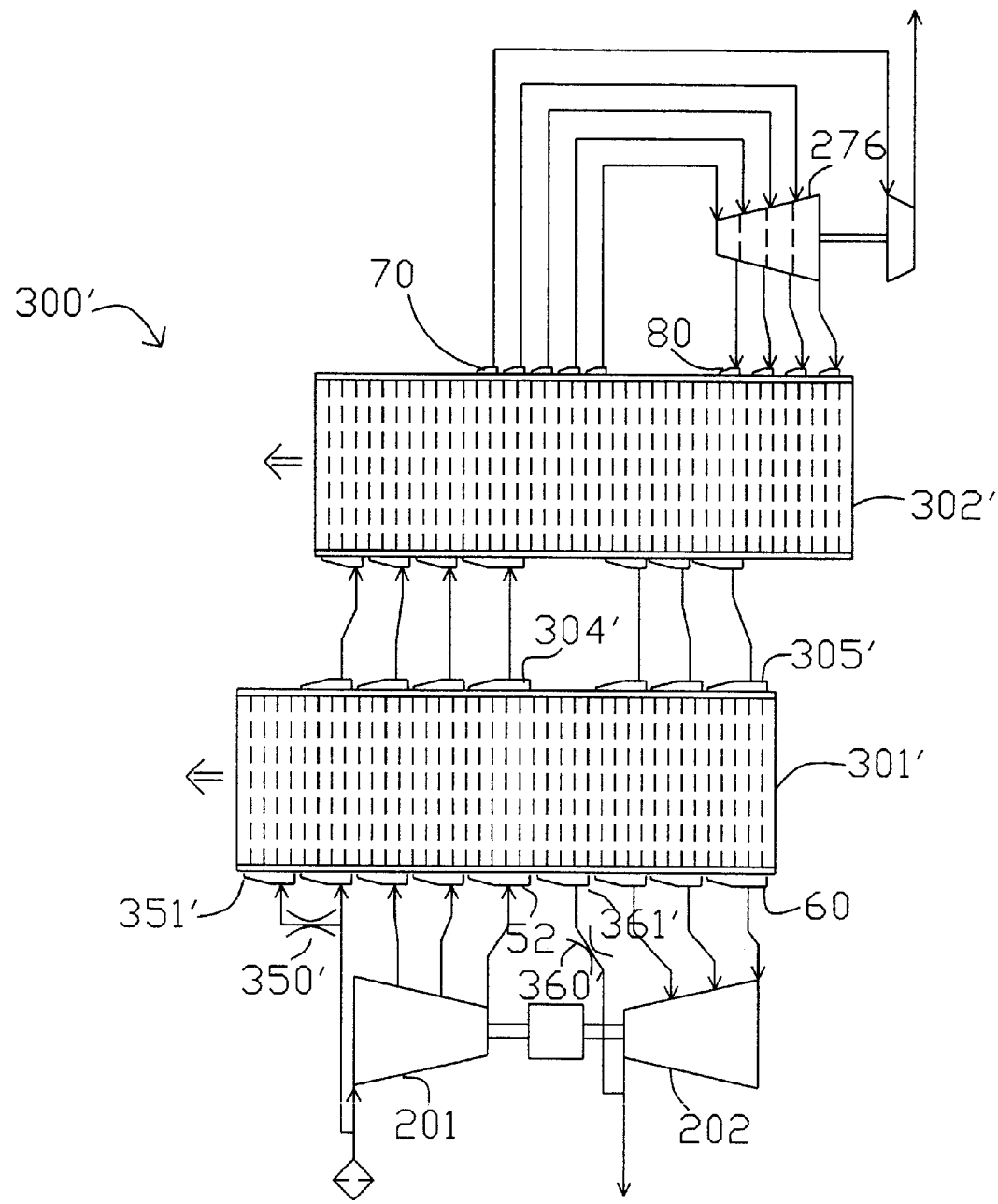
FIG. 13 shows a two stage rotary PSA module according to the present invention, showing its adsorber rotors unrolled in a 360° section about its rotary axis, for separating multicomponent mixtures.

FIG. 13 shows a two stage apparatus 300' according to the invention, comprising two 30 rotary PSA modules 301' and 302', for separating multicomponent mixtures. In the embodiment shown, each of the rotary PSA modules 301' and 302' comprise the radial flow rotary PSA module illustrated in FIGS. 1 through 4 and having its rotor unrolled in a 360° section about its rotary axis. Alternatively, modules 301' and 302' can each be an axial flow rotary PSA module illustrated in FIGS. 8 through 11. The modules 301' and 302' are connected via connecting compartments 304' and 305' such that compartment 304' feeds product gas from modules 301' and 302' and compartment 305' feeds product gas from module 302' to 301'.

The embodiment shown in FIG. 13 illustrates that the cycles for the first and second stages 301' and 302' need not be identical as to basic flow pattern. In this embodiment, the first stage 301' achieves initial pressurization by a feed pressurization step via throttle orifice 350' and compartment 351', whereas the second stage 302' achieves initial pressurization by light reflux from expander 276. As a further example of how flow patterns can be tailored for each module, the first stage 301' of this embodiment achieves initial blowdown via throttle orifice 360' and compartment 361', whereas the second stage 302' achieves initial blowdown cocurrently by light reflux into expander 276.

FIG. 14

Figure 14:
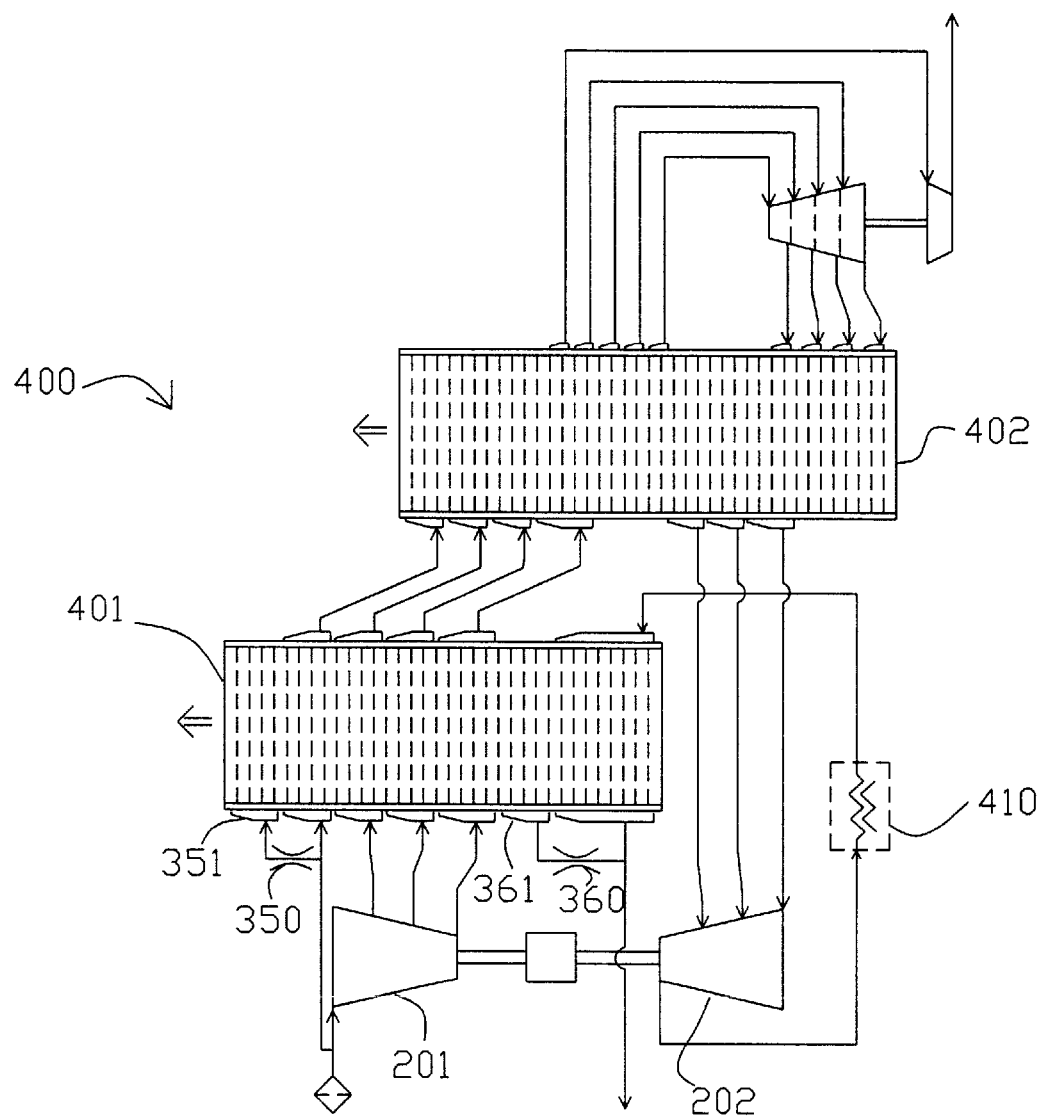
FIG. 14 shows an alternative two stage rotary PSA module according to the present invention, depicting its adsorber rotor unrolled in a 360° section about its rotary axis, with combined pressure swing and thermal regeneration of the first stage.

FIG. 14 shows a two stage rotary PSA apparatus 400 with combined pressure swings and thermal regeneration of the first stage 401. In the embodiment shown, modules 401 and 402 each comprise the radial flow rotary PSA module illustrated in FIGS. 1 through 4 and having its rotor unrolled in a 360° section about its rotary axis. Alternatively, modules 401 and 402 can each be an axial flow rotary PSA module illustrated in FIGS. 8 through 11. First stage 401 achieves initial pressurization by a feed pressurization step via throttle orifice 350 and compartment 351, and achieves initial blowdown via throttle orifice 360 and compartment 361.

Vacuum pump 202 is provided to pull a vacuum for desorbing adsorbent 24 in module 402, thereby effecting vacuum regeneration. The exhaust of the vacuum pump 202, already heated by compression, is further heated in heat exchanger 410, and then used to purge the first module 301 at substantially atmospheric pressure. While vacuum regeneration is operative with respect to the second module 402, the first module 401 of this embodiment does not operate under vacuum and hence operates with a lower overall upper to lower pressure ratio.

Regeneration in the first module 401 is achieved in part by heating gas used to purge first module 401 with heat exchanger 410. Since the thermal swing operation requires heat exchange with the adsorbent in module 401, the rotor in module 401 operates at a lower rotational speed, of about 0.5 to 3 RPM, relative to the rotor of module 402.

FIG. 15

Figure 15:
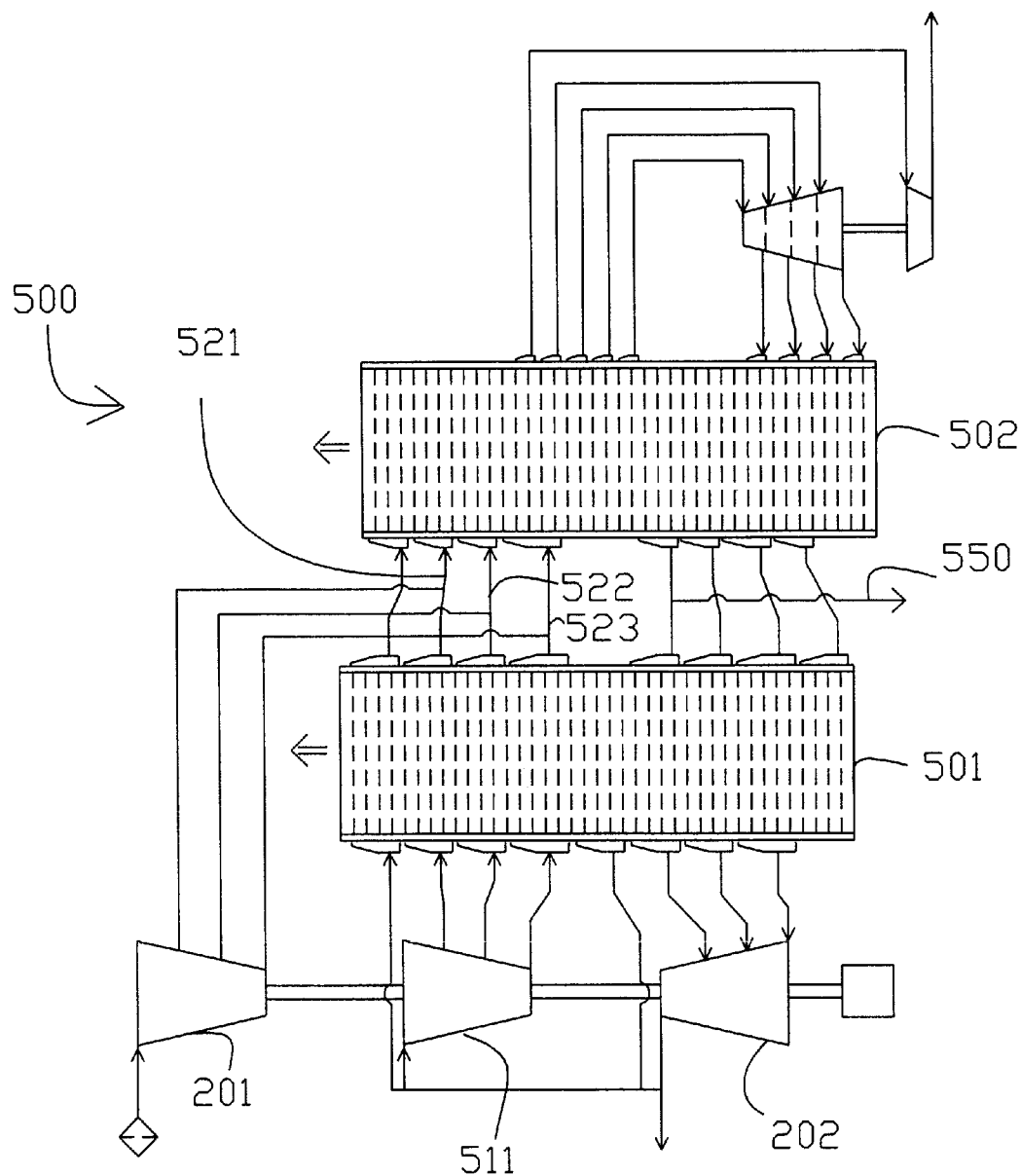
FIG. 15 shows a two stage rotary PSA module according to the present invention, showing its adsorber rotor unrolled in a 360° section about its rotary axis, capable of substantially complete separation of a two component mixture.

FIG. 15 shows a two stage apparatus 500, comprising two rotary PSA modules 501 and 502, capable of substantially complete separation of a two component mixture. In the embodiment shown, end of modules 501 and 502 comprise the rotary PSA module illustrated in FIGS. 1 through 4 and having its rotor unrolled in a 360 section about its rotary axis. Alternatively, modules 501 and 502 can each be an axial flow rotary PSA module illustrated in FIGS. 8 through 11.

Light reflux is used in the second stage module 502 to provide a high purity light product. A heavy reflux compressor 511 is used in the first stage module 501 to provide a high purity heavy product, or equivalently to achieve very high recovery of the light product. The heavy product is delivered from conduit 510, which may be connected to the inlet or any delivery port of the heavy reflux compressor 511 according to the desired delivery pressure of the heavy product.

The feed is introduced to connecting manifolds 521, 522 and 523 communicating between compartments of the first and second stage modules 501 and 502. A purge is also released from conduit 550 communicating to a connecting compartment between the first and second stages modules 501 and 502. This purge allows higher parities to be achieved when it is desired to purify both light and heavy products simultaneously.

It will be appreciated that any of the two-stage systems illustrated in FIGS. 12, 13, or 14 can be used as air separators to produce oxygen from humid or contaminated air. In such cases, the adsorbent 24 of the first stage rotor is a desiccant for removing water, carbon dioxide, and any vapor contaminants from the feed air. The second stage rotor removes nitrogen for air separation. The first stage preferably operates at a lower frequency, particularly if thermal swing regeneration is used as in the case of the embodiment shown in FIG. 14. During shut-down, isolation valves in each of the conduits interconnecting the first and second stage rotors can be closed, in order to prevent diffusive migration of water vapor out of the desiccant and into the air separation zeolite adsorbent which could thereby be deactivated.

However, as discussed above, the invention has applications not limited to oxygen separation. For instance, in one variation, the embodiment shown in FIG. 13 is applied to hydrogen separation from syngas, syngas being those gaseous products produced from natural gas by steam methane reforming. The first stage rotor removes water and carbon dioxide. The second stage rotor removes carbon monoxide, methane and nitrogen impurities from the hydrogen.

In another variation, the apparatus of FIG. 13 is used to separate hydrogen from refinery offgases, such as hydrotreater purge gas or catcracker gas. The first stage rotor removes heavier hydrocarbon vapors and hydrogen sulfide. The second stage rotor removes light hydrocarbon impurities from the hydrogen. In either of these embodiments, the adsorbent used in the rotor for each stage is different.

In another variation, the apparatus shown in FIG. 14 is used for the enrichment of methane from landfill gas, with the first stage removing water vapor and contaminant vapors, and the second stage removing carbon dioxide.

In yet another variation, the apparatus illustrated in FIG. 15 is used as an air separator to produce nitrogen, or to produce oxygen and nitrogen simultaneously. The air feed is introduced to the first end of the second stage rotor, which has light reflux to produce purified oxygen. The first stage rotor has heavy reflux to produce purified nitrogen at its first end.

In still another variation, the apparatus depicted in FIG. 15 is used to separate hydrogen from steam reformate syngas, to produce purified hydrogen and carbon dioxide simultaneously. The syngas feed is introduced to the first end of the second stage rotor, which has light reflux to produce purified hydrogen. The first stage rotor has heavy reflux to produce purified carbon dioxide at its first end.

The present invention is defined by the claims appended hereto, with the foregoing description being illustrative of the preferred embodiments of the present invention. Those of ordinary skill may envisage certain additions, deletions or modifications to the described embodiments which, although not explicitly disclosed herein, do not depart from the spirit or scope of the invention as defined by the appended claims.

I claim:

1. A gas separation system comprising:

a first adsorbent module including a first feed gas inlet for receiving a feed gas mixture, at least one first adsorbent bed of first adsorbent material in communication with the first feed gas inlet for adsorbing a gas mixture component from the feed gas mixture, and a first gas outlet in communication with the at least one first adsorbent bed for receiving a first product gas therefrom, the first product gas substantially depleted in the adsorbed feed gas mixture component; and a second adsorbent module including a second gas inlet fluidly connected to the first gas outlet for receiving the first product gas, at least one second adsorbent bed of second adsorbent material in communication with the second gas inlet for adsorbing a first product gas component from the first product gas, and a second gas outlet in communication with the at least one second adsorbent bed for receiving a second product gas therefrom, the second product gas substantially depleted in the adsorbed first product gas component, the first and second adsorbent modules being configured for transferring the first product gas between the adsorbent modules, wherein the second gas adsorbent module includes a light reflux gas exit for providing pressurized light reflux gas, a pressure letdown means in communication with the light reflux gas exit for facilitating pressure letdown of the pressurized light reflux gas, and a reflux gas inlet for receiving the light reflux gas from the expander after the pressure letdown.

2. The gas separation system according to claim 1, wherein the adsorbent modules comprise pressure swing gas adsorbent modules, the first gas adsorbent module including a second feed gas inlet, and the second gas adsorbent module including a countercurrent blowdown gas outlet coupled to the second feed gas inlet for providing the first gas adsorption module with blowdown gas.

3. The gas separation system according to claim 2, wherein the first gas adsorbent module includes a compressor for providing the feed gas mixture, and a vacuum pump fluidly connected to the countercurrent blowdown gas outlet for effecting vacuum regeneration of the second gas adsorbent module.

4. The gas separation system according to claim 4, wherein the first gas adsorbent module further includes a heat exchanger coupled between the vacuum pump and the countercurrent blowdown outlet for effecting purging of the first gas adsorbent module.

5. The gas separation system according to claim 1, wherein the adsorbent modules comprise pressure swing gas adsorbent modules, the second gas adsorbent module includes a heavy reflux gas outlet for providing heavy reflux gas, a reflux compressor in communication with the heavy reflux gas outlet for compressing the heavy reflux gas, and a heavy reflux gas inlet for receiving the pressurized heavy reflux gas from the reflux compressor.

6. The gas separation system according to claim 5, wherein the second gas adsorbent module includes a light product gas outlet coupled to the first feed gas inlet for enhancing heavy product recovery.

7. The gas separation system according to claim 1 wherein one of the adsorbent modules comprises a dehumidifier.

8. A method of separating components of a feed gas mixture comprising the steps of:
   providing a first adsorbent module including at least one first adsorbent bed of a first adsorbent material;
   providing a second adsorbent module in communication with the first adsorbent module, the second adsorbent module including at least one second adsorbent bed of a second adsorbent material;
   adsorbing a feed gas mixture component from the feed gas mixture with the first adsorbent material;
   transferring a first product gas from between the first adsorbent module and the second adsorbent module, the first product gas substantially depleted in the adsorbed feed gas mixture component;
   adsorbing a first product gas component from the first product gas with the second adsorbent material, and
   extracting a second product gas from the second adsorbent module, the second product gas substantially depleted in the adsorbed first product gas component;
   wherein the adsorbent modules comprise pressure swing adsorbent modules, and the step of extracting a second product gas comprises the steps of extracting pressurized light reflux gas from the second adsorbent module, and returning the light reflux gas to the second adsorbent module after pressure letdown.

9. The method according to claim 8, wherein the adsorbent modules comprise pressure swing adsorbent modules, and the transferring step comprises the steps of transferring light product gas from the first adsorbent module to the second adsorbent module, and transferring blowdown gas from the second adsorbent module to the first adsorbent module.

10. The method according to claim 8, wherein the adsorbent modules comprise pressure swing adsorbent modules, and the transferring step comprises the steps of extracting blowdown gas from the second adsorbent module under vacuum, and delivering the extracted second product gas to the first adsorbent module under pressure.

11. The method according to claim 10, wherein the delivering step comprises the steps of heating the extracted blowdown gas, and providing the second adsorbent module with the heated blowdown gas.

12. The method according to claim 8, wherein the adsorbent modules comprise pressure swing adsorbent modules, and the step of extracting a second product gas comprises the steps of extracting heavy reflux gas from the second adsorbent module, and returning the heavy reflux gas to the second adsorbent module under increased pressure.

13. A gas separation system comprising:
   a first adsorbent module including a first feed gas inlet for receiving a feed gas mixture, at least one first adsorbent bed of first adsorbent material in communication with the first feed gas inlet for adsorbing a gas mixture component from the feed gas mixture, and a first gas outlet in communication with the at least one first adsorbent bed for receiving a first product gas therefrom, the first product gas substantially depleted in the adsorbed feed gas mixture component;
   a second adsorbent module including a second gas inlet fluidly connected to the first gas outlet for receiving the first product gas, at least one second adsorbent bed of second adsorbent material in communication with the second gas inlet for adsorbing a first product gas component from the first product gas, and a second gas outlet in communication with the at least one second adsorbent bed for receiving a second product gas therefrom, the second product gas substantially depleted in the adsorbed first product gas component, the first and second adsorbent modules being configured for transferring the first product gas between the adsorbent modules; and
   wherein the adsorbent modules comprise pressure swing gas adsorbent modules, the second gas adsorbent module includes a heavy reflux gas outlet for providing heavy reflux gas, a reflux compressor in communication with the heavy reflux gas outlet for compressing the heavy reflux gas, and a heavy reflux gas inlet for receiving the pressurized heavy reflux gas from the reflux compressor.

14. The gas separation system according to claim 13, wherein the first gas adsorbent module further includes a second teed gas inlet, and the second gas adsorbent module further includes a countercurrent blowdown gas outlet fluidly connected to the second feed gas inlet for providing the first gas adsorption module with blowdown gas.

15. The gas separation system according to claim 14, wherein the first gas adsorbent module further includes a compressor for providing the feed gas mixture, and the second gas adsorbent module further includes a vacuum pump fluidly connected to the countercurrent blowdown gas outlet for effecting a vacuum regeneration of the second gas adsorbent module.

16. The gas separation system according to claim 15, wherein the first gas adsorbent module further includes a heat exchanger fluidly connected between the vacuum pump and the countercurrent blowdown outlet for effecting purging of the first gas adsorbent module.

17. The gas separation system according to claim 13, wherein the second gas adsorbent module further includes a light product gas outlet fluidly connected to the first feed gas inlet for enhancing heavy product recovery.

18. A method of separating components of a feed gas mixture comprising the steps of:
    providing a first adsorbent module including at least one first adsorbent bed of a first adsorbent material;
    providing a second adsorbent module in communication with the first adsorbent module, the second adsorbent module including at least one second adsorbent bed of a second adsorbent material;
    adsorbing a feed gas mixture component from the feed gas mixture with the first adsorbent material;
    transferring a first product gas from between the first adsorbent module and the second adsorbent module, the first product gas substantially depleted in the adsorbed feed gas mixture component;
    adsorbing a first product gas component from the first product gas with the second adsorbent material, and
    extracting a second product gas from the second adsorbent module, the second product gas substantially depleted in the adsorbed first product gas component;
    wherein the adsorbent modules comprise pressure swing adsorbent modules, and the step of extracting a second product gas comprises the steps of extracting heavy reflux gas from the second adsorbent module, and returning the heavy reflux gas to the second adsorbent module under increased pressure.

19. The method according to claim 18, wherein the transferring step comprises the steps of transferring light product gas from the first adsorbent module to the second adsorbent module, and transferring blowdown gas from the second adsorbent module to the first adsorbent module.

20. The method according to claim 18, wherein the step of extracting a second product gas comprises the steps of extracting light reflux gas from the second adsorbent module, and returning the light reflux gas to the second adsorbent module after pressure letdown.

21. The method according to claim 18, wherein the transferring step comprises the steps of extracting blowdown gas from the second adsorbent module under vacuum, and delivering the extracted second product gas to the first adsorbent module under pressure.

22. The method according to claim 21, wherein the delivering step comprises the steps of heating the extracted blowdown gas, and providing the second adsorbent module with the heated blowdown gas.

* * * * *